US 6,611,283 B1

(12) United States Patent
Isonuma

(10) Patent No.: US 6,611,283 B1
(45) Date of Patent: Aug. 26, 2003

(54) METHOD AND APPARATUS FOR INPUTTING THREE-DIMENSIONAL SHAPE INFORMATION

(75) Inventor: Tomoyuki Isonuma, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/195,381

(22) Filed: Nov. 18, 1998

(30) Foreign Application Priority Data

Nov. 21, 1997 (JP) .............................................. 9-336624

(51) Int. Cl.[7] .......................... H04N 13/04; H04N 15/00
(52) U.S. Cl. ..................................................... 348/51
(58) Field of Search .............................. 348/42–43, 51, 348/53, 115; 359/376; 345/441

(56) References Cited

U.S. PATENT DOCUMENTS

| | | | | |
|---|---|---|---|---|
| 4,860,220 A | * | 8/1989 | Tanaka et al. ............... | 395/120 |
| 5,003,300 A | * | 3/1991 | Wells .............................. | 345/8 |
| 5,175,616 A | * | 12/1992 | Milgram et al. ............... | 348/47 |
| 5,446,834 A | * | 8/1995 | Deering ........................ | 395/127 |
| 5,801,760 A | * | 9/1998 | Uomori ........................ | 348/47 |
| 5,852,672 A | * | 12/1998 | Lu .............................. | 382/154 |
| 5,912,721 A | * | 6/1999 | Yamaguchi et al. ......... | 351/210 |
| 5,969,725 A | * | 10/1999 | Fujiki et al. ................. | 345/433 |
| 6,023,276 A | * | 2/2000 | Kawai et al. ................ | 345/419 |
| 6,157,382 A | * | 12/2000 | Ohshima et al. ............. | 345/419 |
| 6,191,808 B1 | * | 2/2001 | Katayama et al. ............ | 348/39 |
| 6,198,484 B1 | * | 3/2001 | Kameyama .................. | 345/419 |

FOREIGN PATENT DOCUMENTS

| | | | | |
|---|---|---|---|---|
| EP | 0732672 A2 | * | 9/1996 | .......... G06T/15/10 |
| JP | 406314318 A | * | 11/1994 | .......... G06F/15/60 |
| JP | 08-255266 | * | 1/1996 | .......... G06T/17/00 |

* cited by examiner

Primary Examiner—Vu Le
(74) Attorney, Agent, or Firm—Morgan & Finnegan, LLP

(57) ABSTRACT

Method of efficiently inputting three-dimensional shape information, that is, distance data and depth data, which are prerequisite for presenting a panoramic image or a stereo image to a viewer. The first and second images obtained from an object are presented to a viewer as a stereo image, the left and right lines of sight of the viewer are detected at a predetermined timing, and three-dimensional coordinates of the point of interest where the viewer is gazing at are calculated based on the detected left and right line-of-sight data. The operation of detecting the line of sight and calculating three-dimensional coordinates are repeated with respect to other points of interest, and the group of obtained three-dimensional coordinates of the points of interest are inputted in a memory as the three-dimensional shape information of the object.

36 Claims, 17 Drawing Sheets

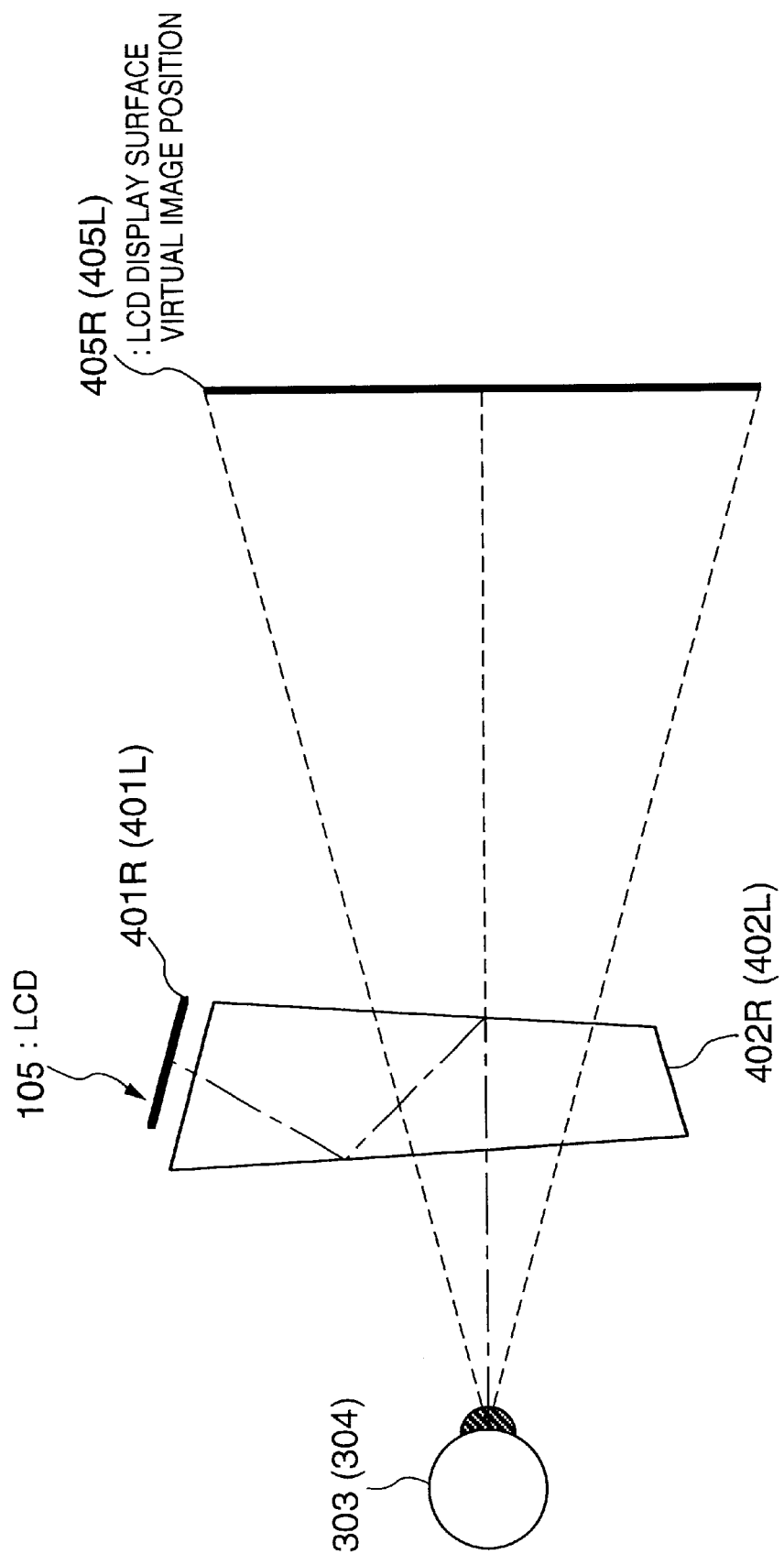

VERTEX DATA TABLE

METHOD AND APPARATUS FOR INPUTTING THREE-DIMENSIONAL SHAPE INFORMATION

BACKGROUND OF THE INVENTION

The present invention relates to a method and apparatus for inputting three-dimensional shape information for extracting three-dimensional shape information of an actual object, i.e., depth information or distance information, and an image input apparatus. More particularly, the present invention relates to simplification of designating corresponding points in a case where the distance or the depth is measured in a range finder or the like.

Conventionally, for instance, in the field of construction or design, it is often necessary to input three-dimensional shape information of an actual object to a computer. By virtue of the recent improvement in drawing capability using three-dimensional computer graphics (CG), a user can be provided with three-dimensional shape information of, for instance, merchandize or a building object. In this case also, three-dimensional shape information of the actual merchandize or building object must be inputted to a computer.

In view of the above background, recently, the technology of inputting three-dimensional shape information of an object has become popular and is becoming increasingly important.

As the typical conventional method of inputting three-dimensional shape information, a method utilizing a contact-type position sensor is known. According to this method, a probe is brought to contact with each point on the surface of an object subjected to measurement, three-dimensional coordinates of the position of the probe are detected, and the detected three-dimensional coordinates of the position of the probe are inputted as three-dimensional position information of each point.

However, in the method of utilizing the contact-type position sensor, the probe needs to be brought to contact with each point of an object. Therefore, the object which can be measured is limited to an object having a size measurable on a table, an object having certain strength, and a stationary object.

For more flexible conventional method of measuring a shape of an object, which is not restrained by the above limitations, a method utilizing a stereo image is known.

According to this method, an image of an object 1303 is picked up at two viewpoints (or the object is picked up twice) by using a stereo-image pickup device 1300 comprising two digital cameras 1301 and 1302 as shown in FIG. 1. The obtained left and right images 1401 and 1402 shown in FIG. 2 are used as an information source.

The obtained two images 1401 and 1402 have a disparity. With respect to a point of interest in the image, two corresponding points in each of the left and right images 1401 and 1402 are designated. Three-dimensional coordinates of the point of interest are obtained by the trigonometry theory using two-dimensional coordinates of the two corresponding points. In this manner, a number of representative points are designated on the object as points of interest, and three-dimensional coordinates of the representative points are obtained as three-dimensional shape information of the object, i.e., distance information or depth information.

Normally, a polygon is constructed by using these representative points as vertices, and an object shape having surfaces is defined. For a method of generating a polygon using arbitrary vertices, Doronet method is well known.

However, the above-described conventional examples have the following problems.

More specifically, in the method of inputting three-dimensional shape information by the conventional stereo-image pickup device 1300 (or using images obtained by performing pickup operation twice), a large number of points of interest must be designated in the left and right images 1401 and 1402. In addition, designating a point of interest requires manual operation for designating corresponding points of the point of interest on the left and right images 1401 and 1402 by an operator using a mouse or the like.

In the manual designation operation, as shown in FIGS. 2A and 2B, an operator first looks at the left image 1401 (or right image 1402) and designates an arbitrary representative point 1403, then looks at the right image 1402 (or left image 1401) and designates a corresponding point 1404 which corresponds to the designated representative point 1403 with a mouse.

However, this operation must be performed for a large number of representative points, causing great physical and mental pain to the operator.

To reduce such operation of designating corresponding points, a known method is to automatically obtain corresponding points by computing correlation between the left and right images 1401 and 1402. By this method, correlation levels are defined with respect to the two corresponding points of the left and right images 1401 and 1402. For a given point on the left image 1401 (or right image 1402), a point on the right image 1402 (or left image 1401) having the largest correlation level is designated as the corresponding point.

To calculate the correlation level, rectangular areas, each having the same size, are defined. Each of the rectangular areas surrounds the corresponding two points in the left and right images 1401 and 1402. In the rectangular areas, two-dimensional correlation is obtained between the left pixel value data L(x, y) and the right pixel value data R(x, y).

However, the automatic detection of corresponding points achieved by the correlation calculation also has the following problems.

I: To reduce calculation time, the area subjected to correlation calculation must be narrowed down. To narrow down the calculation area, operator's auxiliary input is necessary, i.e., operator must designate rough corresponding points. Even if the area is narrowed down, calculation of corresponding points is time consuming due to the processing capability of a computer. During the calculation, the operator's operation must be suspended. Furthermore, if the area subjected to correlation calculation is not narrowed down, unrealistic calculation time is required for some image sizes.

II: For at least one of the left or right images 1401 or 1402, representative points must be selected and the positions of the representative points must be manually inputted with a mouse or the like.

III: Due to limitations in precision of correlation calculation, wrong corresponding points may sometimes be given. Therefore, corresponding points calculated by the computer must be always confirmed by an operator, and if it is wrong, corresponding points must be manually designated by the operator.

As described above, according to the method of inputting three-dimensional shape information using two images 1401 and 1402 picked up by the stereo-image pickup device 1300 (or using images obtained by performing pickup operation twice), time consuming operation is required for designating corresponding points. Although cumbersome operation posed to the operator is somewhat reduced because of the introduction of automatic corresponding point detection utilizing correlation coefficients, input operation with a mouse is still necessary, thus operational burden is still large.

SUMMARY OF THE INVENTION

The present invention is made in consideration of the above situation, and has as its object to provide a method of efficiently identifying three-dimensional coordinates of corresponding points on a plurality of images, for a point of interest of an object.

According to the present invention, the foregoing object is attained by providing a method of identifying three-dimensional coordinates of points of interest on a plurality of images obtained from an object, comprising the steps of: presenting to a viewer a first image and a second image as a stereo image, which are arbitrarily selected from among the plurality of images; detecting left and right lines of sight of the viewer while the first and second images are presented to the viewer; and calculating three-dimensional coordinates of a point of interest at which the viewer is gazing, based on the detected left and right line-of-sight data.

Furthermore, in order to attain the above object, the present invention provides an apparatus for identifying three-dimensional coordinates of points of interest on a plurality of images obtained from an object, comprising: stereo-image presenting means for presenting to a viewer a first image and a second image as a stereo image, which are arbitrarily selected from among the plurality of images; detecting means for detecting left and right lines of sight of the viewer viewing the stereo image presented by the stereo-image presenting means; and calculating means for calculating three-dimensional coordinates of a point of interest at which the viewer is gazing, based on the detected left and right line-of-sight data.

The method and apparatus having the above configuration utilize the theory in which the points of interest a viewer (user) gazes at on a plurality of displayed images (stereo image) should be the corresponding points on an object. Therefore, by detecting the left and right lines of sight of the viewer, it is possible to identify three-dimensional coordinates of the point of interest, i.e., three-dimensional coordinates of the point on the object.

In order for a viewer to efficiently gaze at the point of interest, it is preferable that the presented image gives the viewer stereoscopic feeling. Therefore, according to an aspect of the present invention, the first and second images presented in the presenting step are images of an object picked up in advance or about to be picked up, by stereo cameras spaced from each other by a base length.

According to an aspect of the present invention, the viewer gazes at a vertex on the stereo image as a point of interest.

According to another aspect of the present invention, obtained in the calculating step are: two-dimensional coordinates of the point of interest in first and second image coordinate systems provided respectively for the first and second images, obtained based on a distance L from an eyeball of the viewer to a display surface where the first and second images are displayed, and the left and right lines of sight; and three-dimensional coordinates of the point of interest, obtained based on obtained coordinates positions of the point of interest in either one of the first and second image coordinate systems, the base length of the viewer, and a difference of the coordinate positions of the point of interest in the first and second image coordinate systems.

According to an aspect of the present invention, a line of sight of the viewer is detected by detecting a rotation of the eyeball with respect to two axes of the eyeball in the detecting step.

There are many points of interest on an image. In order to assure capturing these points of interest, it is necessary to set the timing for detecting the line of sight. For this, the present invention further comprises a step of initiating the detecting step.

According to an aspect of the present invention, the initiating step starts the detecting step on a manual input instruction by the viewer, e.g., operating a keyboard or a mouse.

According to an aspect of the present invention, the timing at which the detecting step should be started is determined in the initiating step based on variations in the line of sight of the viewer.

According to an aspect of the present invention, the timing at which the detecting step should be started is determined in the initiating step by detecting a state where the variations in the line of sight of the viewer are smaller than a predetermined threshold. When the variations in the line of sight of the viewer are small, the view point is recognized as a point of interest by the viewer.

In order to improve precision in determination of a point of interest, according to an aspect of the present invention, the initiating step comprises: a second detecting step of detecting line-of-sight data of the viewer in a sequential order; a step of storing in a predetermined memory, only the line-of-sight data having a smaller variation in the line of sight than a predetermined threshold; and a step of deciding timing to start the detecting step when the stored line-of-sight data reaches a predetermined sample number.

Further, according to an aspect of the present invention, an average value of the predetermined sample number of line-of-sight data is calculated in the calculating step, in response to the timing deciding step; and three-dimensional coordinates of the point of interest are calculated based on the calculated average value of line-of-sight data.

The period of time a viewer gazes at a point of interest varies depending on individuals. For a viewer who gazes at the point of interest for a long time, the apparatus may detect the same point as a sample for a number of times. Therefore, according to an aspect of the present invention, the calculating step further comprises the steps of: sequentially storing in a predetermined memory, line-of-sight data detected at the timing decided in the timing deciding step; and in a case where variations in a number of line-of-sight data are larger than a predetermined threshold value among a plurality of line-of-sight data stored in the predetermined memory, deleting the number of line-of-sight data except one data.

According to an aspect of the present invention, in the detecting step, a rotation amount of the eyeball in the vertical direction and a rotation amount of the eyeball in the horizontal direction are detected as a line of sight.

Another object of the present invention is to provide an apparatus for efficiently identifying three-dimensional coordinates of corresponding points on a plurality of images, for a point of interest of an object. In order to attain the object, the present invention provides an apparatus for identifying three-dimensional coordinates of points of interest on a plurality of images obtained from an object, comprising: stereo-image presenting means for presenting to a viewer a first image and a second image as a stereo image, which are arbitrarily selected from among the plurality of images; detecting means for detecting left and right lines of sight of the viewer viewing the stereo image presented by the stereo-image presenting means; and calculating means for calculating three-dimensional coordinates of a point of interest at which the viewer is gazing, based on the detected left and right line-of-sight data.

According to an aspect of the present invention, the detecting means further comprises: irradiation means having a light source which irradiates an invisible ray for irradiating each eyeball; an optical system for focusing the invisible ray reflected by each eyeball; image pickup means for picking up an image formed by the optical system; and means for obtaining a center position of the pupil in the eye and a position of the light source in a virtual image formed by cornea reflection, based on the picked-up image of the eyeball, and obtaining a rotation angle of the eyeball based on a relative relation between the center position and the position of virtual image.

According to an aspect of the present invention, the detecting means detects a state in which variations in line-of-sight angles of the eyeball of the viewer remain smaller than a predetermined threshold value for a predetermined period, determines a point of interest of the viewer during the predetermined period based on an arbitrary line-of-sight angle value or a line-of-sight angle average value, and selects the point of interest as a point for defining a shape of the object.

In order to appropriately present a stereo image to a viewer, it is preferable that the display surface and the viewpoint position of the viewer be known. For this purpose, according to an aspect of the present invention, the stereo-image presenting means comprises a head-mount display device which keeps a fixed relative positional relation between a viewer's head and a display surface.

In a case where the device for detecting the angle of eyeball is worn by a viewer, unknown errors are often generated. Therefore, according to an aspect of the present invention, the stereo-image presenting means comprises: a stereo-image display fixed on a table; and means for correcting the stereo-image presenting means by detecting a relative positional deviation of the viewer's head with respect to the display.

Another object of the present invention is to provide a method of efficiently inputting data indicative of three-dimensional shape. In order to attain the object, the present invention provides a three-dimensional shape information input method of inputting three-dimensional coordinates of points of interest on a plurality of images obtained from an object as three-dimensional shape information, comprising the steps of: presenting to a viewer a first image and a second image as a stereo image, which are arbitrarily selected from among the plurality of images; detecting at a predetermined timing, left and right lines of sight of the viewer while the first and second images are presented to the viewer; calculating three-dimensional coordinates of a point of interest at which the viewer is gazing, based on the left and right line-of-sight data detected in the detecting step; and repeating the detecting step and calculating step with respect to other points of interest, and inputting a group of three-dimensional coordinates of points of interest obtained respectively, in a memory as three-dimensional shape information of the object.

Another object of the present invention is to provide an apparatus for efficiently inputting data indicative of three-dimensional shape. In order to attain the object, the present invention provides a three-dimensional shape information input apparatus for inputting three-dimensional coordinates of points of interest on a plurality of images obtained from an object as three-dimensional shape information, comprising: presenting means for presenting to a viewer a first image and a second image as a stereo image, which are arbitrarily selected from among the plurality of images; detecting means for detecting at a predetermined timing, left and right lines of sight of the viewer while the first and second images are presented to the viewer; calculating means for calculating three-dimensional coordinates of a point of interest at which the viewer is gazing, based on the left and right line-of-sight data detected by the detecting means; and input means for inputting a group of three-dimensional coordinates of points of interest, obtained by the detecting means and the calculating means with respect to a number of points of interest, in a memory as three-dimensional shape information of the object.

Another object of the present invention is to provide a method of inputting three-dimensional viewer's indication utilizing line-of-sight data. In order to attain the object, the present invention provides a three-dimensional line-of-sight indicating method of inputting viewer's indication based on points of interest viewed by a viewer on a first image and a second image obtained from an object, comprising the steps of: presenting to the viewer the first and second images as a stereo image; detecting left and right lines of sight of the viewer while the first and second images are presented to the viewer; calculating three-dimensional coordinates of a point of interest at which the viewer is gazing, based on the detected left and right line-of-sight data; and outputting the calculated three-dimensional coordinates of the point of interest as viewer's indication data.

Another object of the present invention is to provide an apparatus for inputting three-dimensional indication of a viewer by using line-of-sight data. In order to attain the object, the present invention provides a three-dimensional line-of-sight indicating apparatus for inputting viewer's indication based on points of interest viewed by a viewer on a first image and a second image obtained from an object, comprising: presenting means for presenting to the viewer the first and second images as a stereo image; detecting means for detecting left and right lines of sight of the viewer while the first and second images are presented to the viewer; calculating means for calculating three-dimensional coordinates of a point of interest at which the viewer is gazing, based on the detected left and right line-of-sight data; and outputting means for outputting the calculated three-dimensional coordinates of the point of interest as viewer's indication data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principle of the invention.

FIG. 6 is an explanatory view for explaining the theory of stereoscopic viewing in the three-dimensional shape information input apparatus shown in FIG. 3;

DETAILED DESCRIPTION OF THE PREFERRED EMBODIMENTS

Preferred embodiments of the present invention will be described in detail in accordance with the accompanying drawings.

First Embodiment

Figure 1:
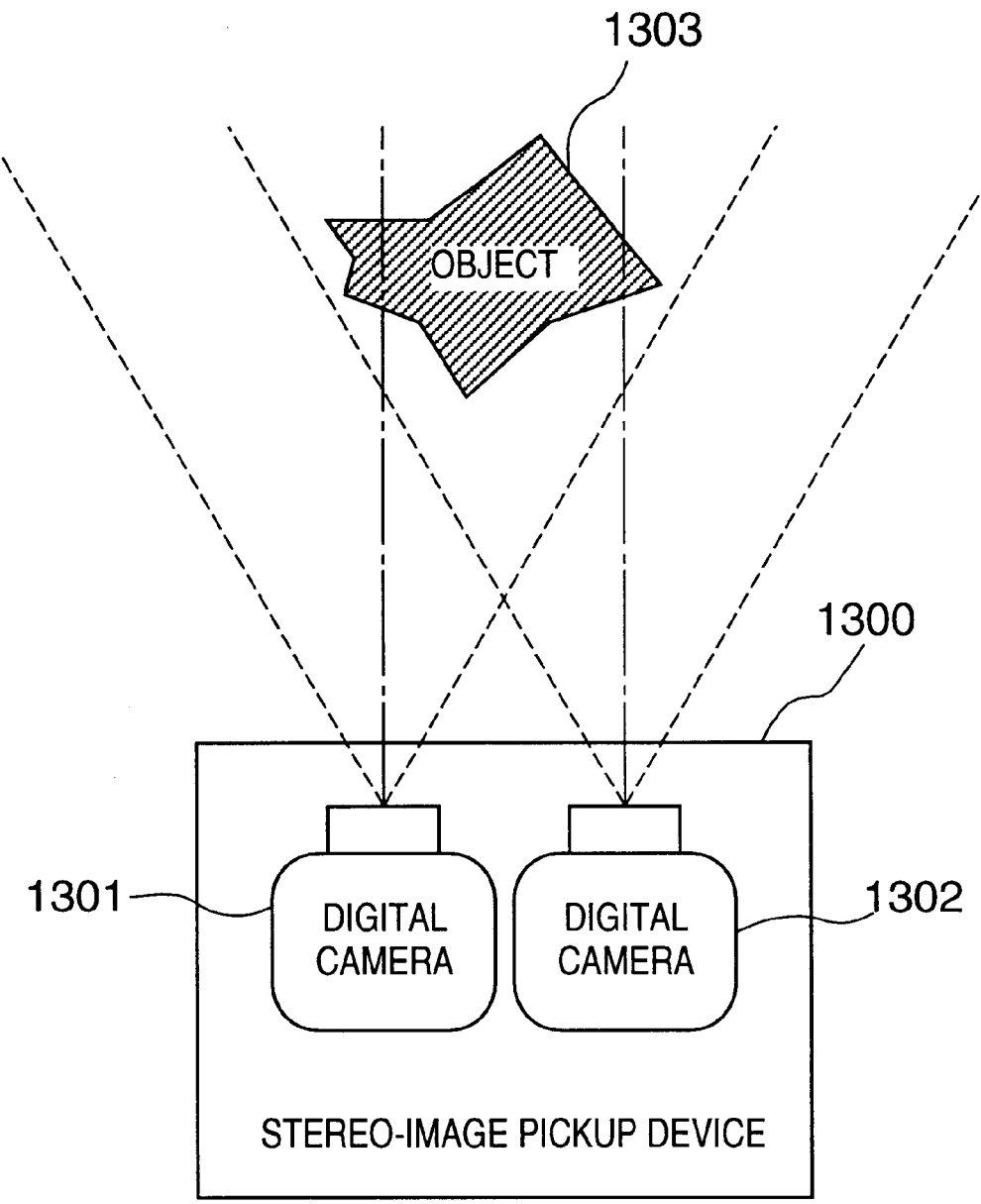
FIG. 1 is a view showing a construction of a conventional stereo-image pickup device.
Figure 2B:
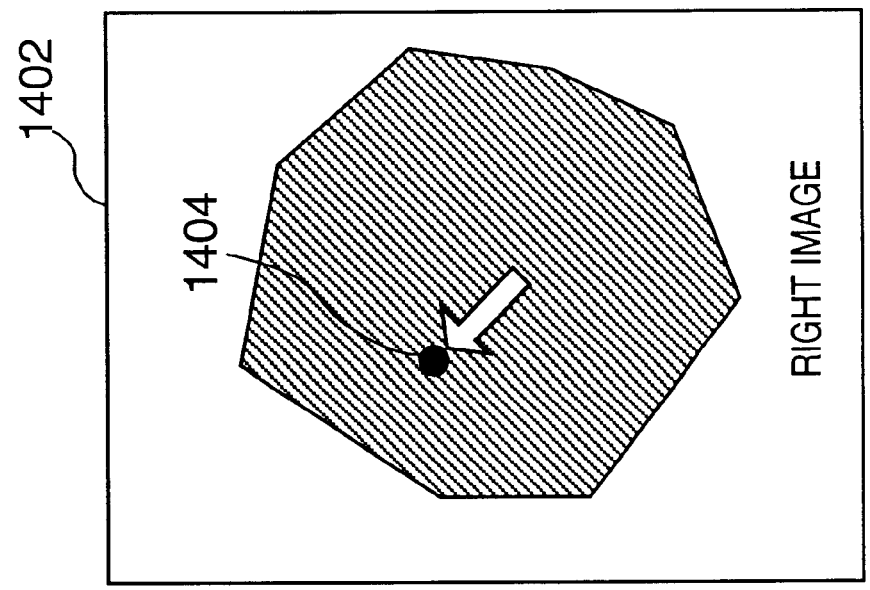
FIGS. 2A and 2B are explanatory views for explaining a method of inputting shape data by utilizing a stereo image obtained by the device shown in FIG. 1.
Figure 2A:
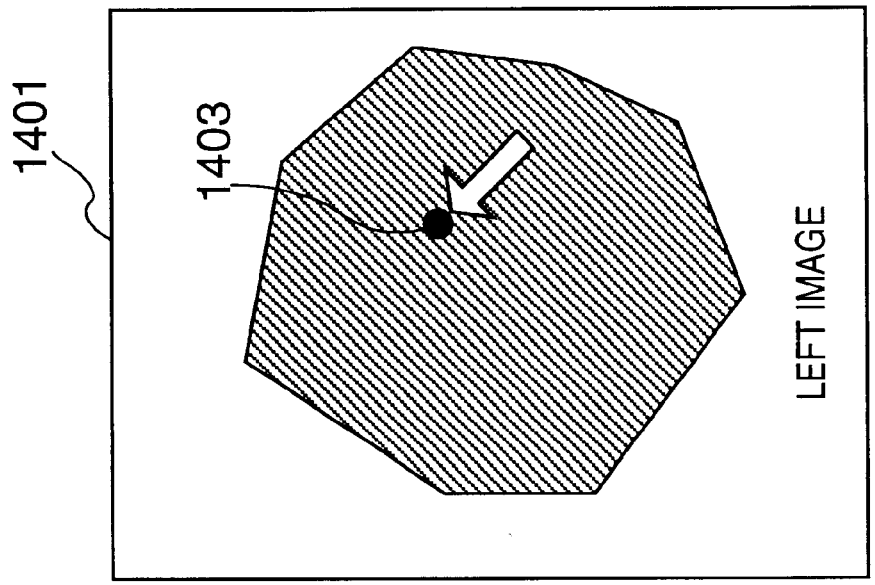
Figure 3:
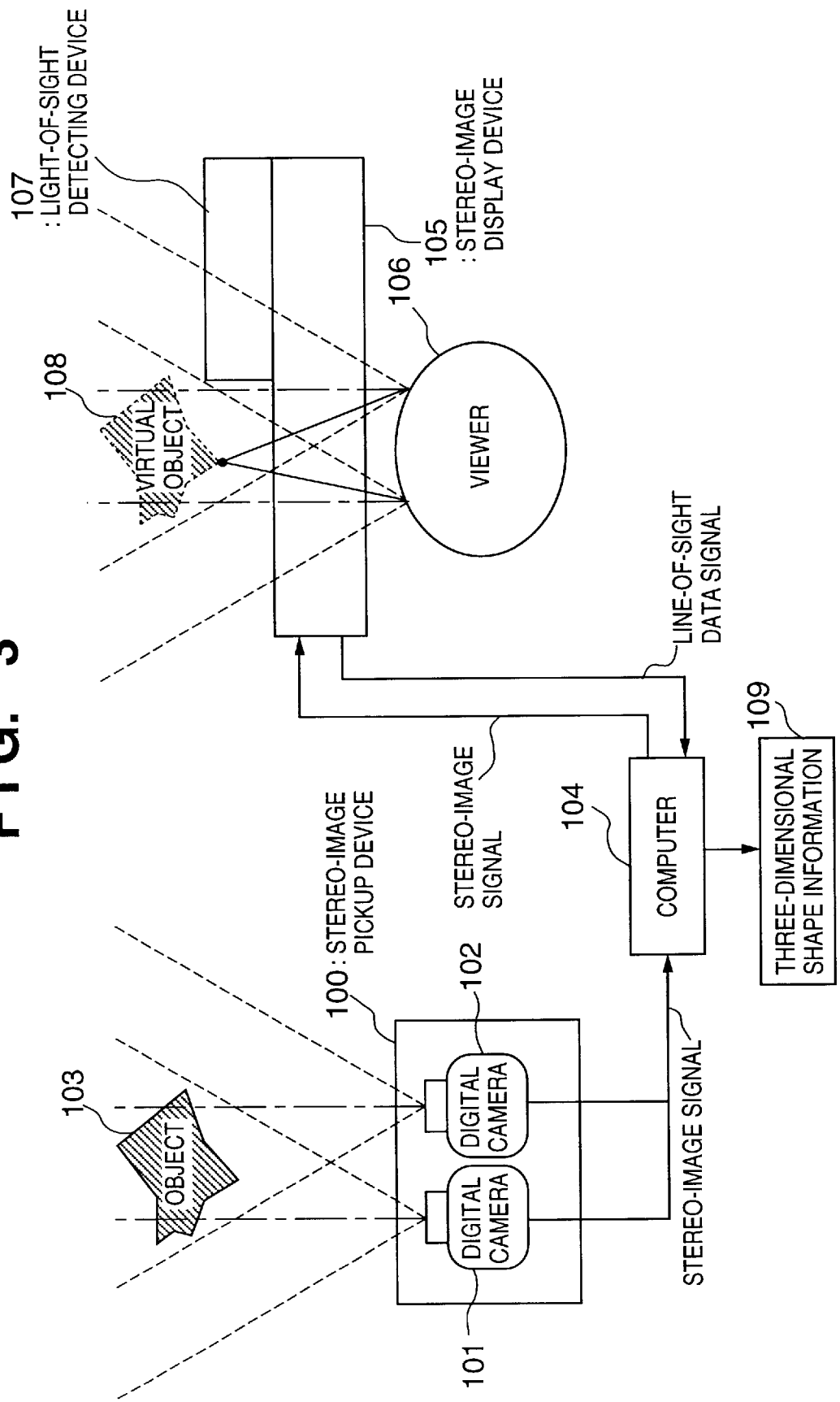
FIG. 3 is a block diagram showing a construction of a three-dimensional shape information input apparatus according to the first embodiment of the present invention.

The first embodiment of the present invention will be described with reference to FIGS. 3 to 12.
<Construction—First Embodiment>
FIG. 3 is a conceptual view showing a construction of a three-dimensional shape information input apparatus according to the first embodiment of the present invention.

The three-dimensional shape input apparatus comprises a stereo-image pickup device 100, computer 104, stereo-image display device 105, and line-of-sight detecting device 107. To obtain three-dimensional shape information (distance or depth information) of an object 103, the object 103 is picked up by the stereo-image pickup device 100, and the picked up image is presented as a stereo image 108 to a user by the stereo-image display device 105 through the computer 104. The line-of-sight detecting device enables a user to efficiently designate corresponding points by detecting the line of sight of the user who is viewing the presented stereo image.

The stereo-image pickup device 100 comprises two digital cameras 101 and 102 provided as image pickup means for the right and left images. The digital camera 101 for the left eye and the digital camera 102 for the right eye are spaced from each other by a predetermined distance, and situated such that respective optical axes are parallel.

The stereo-image display device 105, mounted on the head of a viewer 106, comprises the line-of-sight detecting device 107 which detects the lines of sight of both eyes of the viewer 106.

Reference numeral 108 denotes a virtual object displayed on the stereo-image display device 105. The line-of-sight detecting device 107 outputs line-of-sight data signals to the computer, and the computer 104 generates three-dimensional shape information 109 based on the data signals and the outputted results of the cameras 101 and 102.

Referring to FIG. 3, the stereo images of the object 103 picked up by the digital cameras 101 and 102 are inputted to the computer 104 and displayed by the stereo-image display device 105. During inputting shape data of the object, the viewer 106 gazes at the virtual object 108 displayed on the stereo-image display device 105. Simultaneously, the line-of-sight detecting device 107 detects the line of sight of the viewer 106. The detected line-of-sight data is inputted to the computer 104 which analyzes the line-of-sight data and extracts three-dimensional shape information 109.

Figure 4:
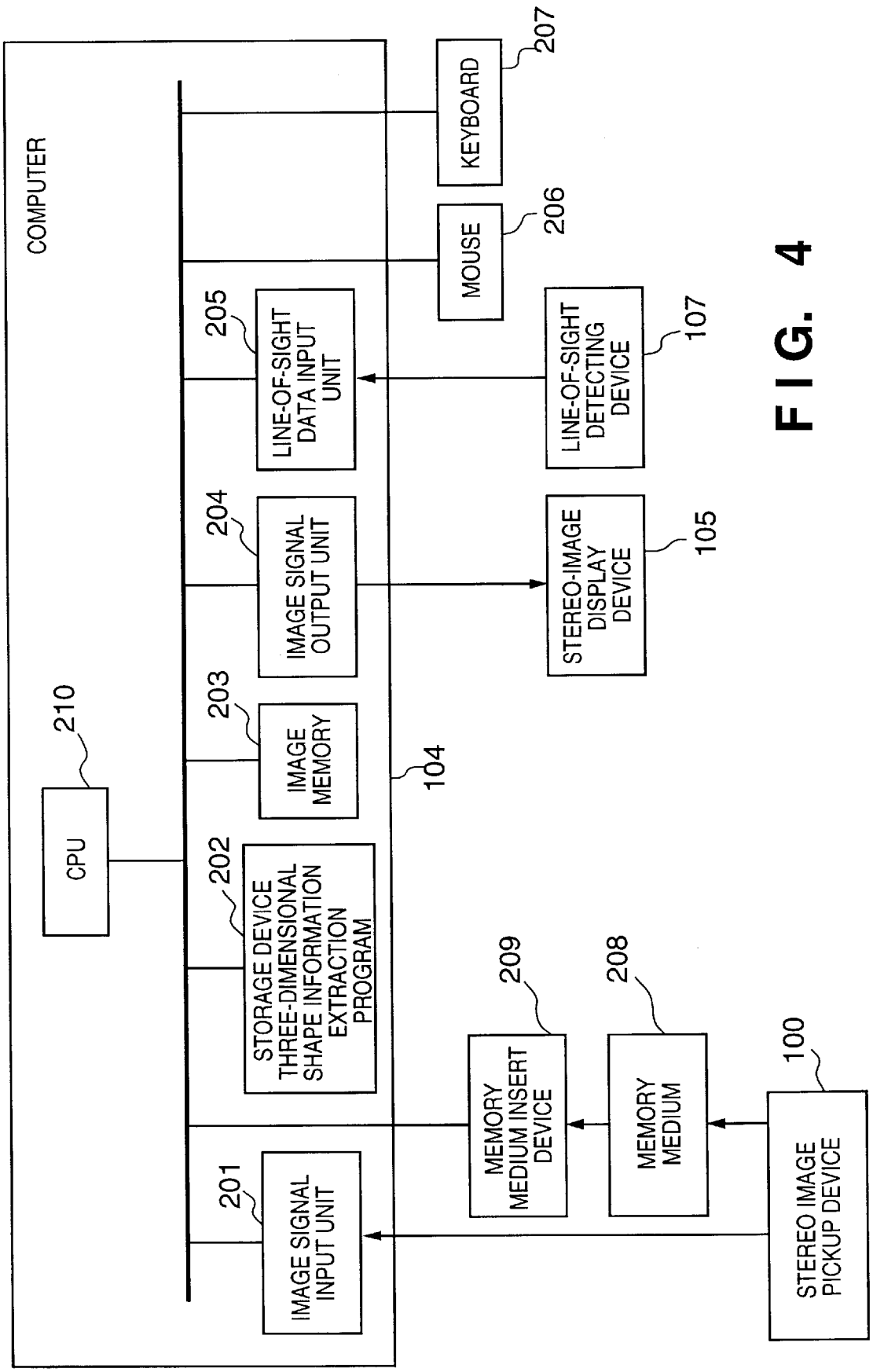
FIG. 4 is a block diagram showing a construction of a computer in the three-dimensional shape information input apparatus shown in FIG. 3.

FIG. 4 is a block diagram showing a construction of the computer 104 which constitutes stereo-image combining means and control means adopted by the three-dimensional shape information input apparatus.

In FIG. 4, the computer 104 comprises an image signal input unit 201, storage device 202, image memory 203, an image signal output unit 204, a line-of-sight data input unit 205, a mouse 206, a keyboard 207, a recording medium loading device 209 where a recording medium 208, e.g., magneto optical disk or the like, is inserted, and CPU (Central Processing Unit) 210. Each of the components 201 to 209 is connected to the CPU 210 via bus 211. The stereo-image pickup device 100 is connected to the image signal input unit 201 and recording medium 208. The stereo-image display device 105 is connected to the image signal output unit 204. The line-of-sight detecting device 107 is connected to the line-of-sight data input unit 205.

Referring to FIG. 4, a program (three-dimensional shape information extracting program) for extracting three-dimensional shape information from the line-of-sight data is stored in the storage device 202, and the program is executed by the CPU 210. Stereo images picked up by the stereo-image pickup device 100 are inputted to the computer 104 through the image signal input unit 201 or recording medium loading device 209 and derived by the computer 104. The inputted stereo image is stored in the image memory 203, and outputted to the stereo-image display device 105 through the image signal output unit 204.

The line-of-sight data outputted by the line-of-sight detecting device 107 is inputted to the computer 104 through the line-of-sight data input unit 205. To provide communication between an operator and computer 104, input devices such as the mouse 206 and keyboard 207 and so forth are used.

<Theory of Stereoscopic Viewing and Detecting Line of Sight>

Before describing the stereo-image display device 105 and line-of-sight detecting device 107, first, description will be provided on a theory of stereoscopic viewing and the theory of extracting three-dimensional shape information of a point of interest from the line-of-sight data.

Theory of enabling a viewer to experience a three-dimensional effect by using the stereo-image display device 105 is well known. Herein, this theory is briefly explained.

Figure 5B:
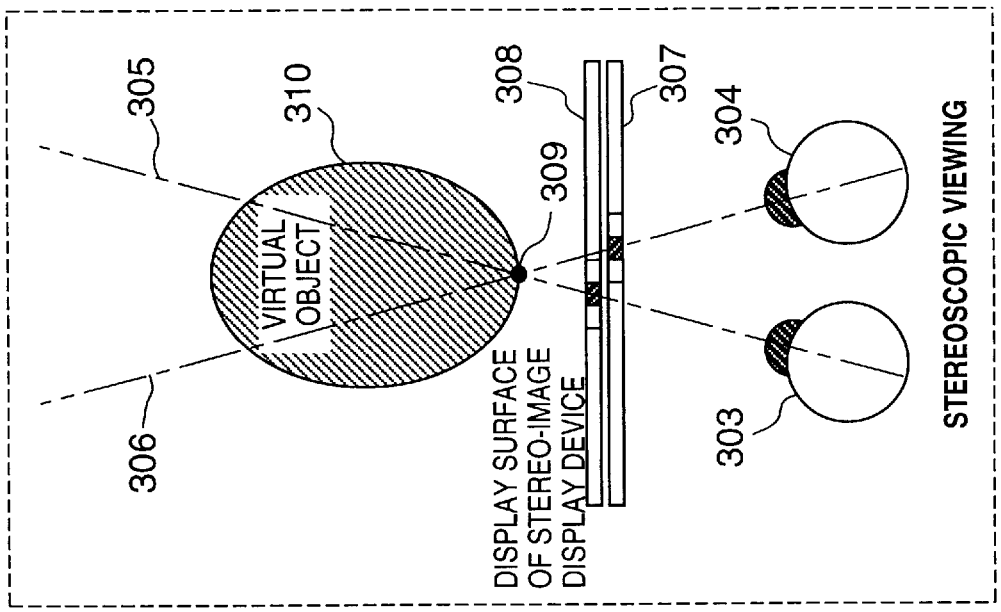
FIGS. 5A and 5B are explanatory views for explaining a theory of stereoscopic viewing in the three-dimensional shape information input apparatus shown in FIG. 3.
Figure 5A:
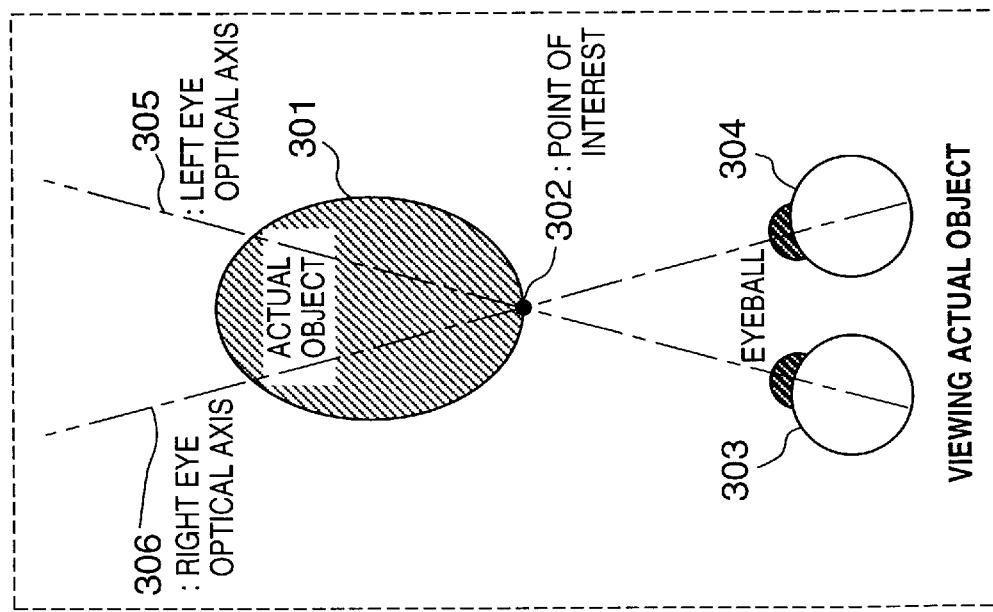

FIG. 5A is a top view of an actual object and a viewer who views the object; and FIG. 5B is a top view of a viewer and a stereo-image display device.

When a viewer gazes at a point of interest 302 of an actual object 301 existing in a three-dimensional space as shown in FIG. 5A, the directions of the left eyeball 303 and the right eyeball 304 of the viewer are adjusted such that optical axes 305 and 306 of the eyeballs 303 and 304 intersect at the point of interest 302. This adjusting operation, called "binocular fusion," corresponds to coinciding the positions of point of interest in the respective images on the retinas of the left and right eyeballs 303 and 304. The stereo-image display device utilizing stereoscopic view achieves a stereoscopic effect by inducing the binocular fusion effects on a viewer. More specifically, as shown in FIG. 5B, left and right images 307 and 308 having disparity are separately and independently inputted to the left and right eyes by a predetermined method. The viewer, gazing at the stereo-image display device, controls the optical axes 305 and 306 of the left and right eyeballs 303 and 304 so as to fuse the left and right images 307 and 308 at the point of interest. As a result, the viewer feels as if there is the point of interest positioned at the intersecting point of the optical axes 305 and 306, i.e., point 309 in FIG. 5B. In this manner, the viewer is able to view the virtual object 310.

Note that although the left and right images 307 and 308 in FIG. 5B are shown as if the images are deviated, they are actually displayed in the same position.

Figure 7:
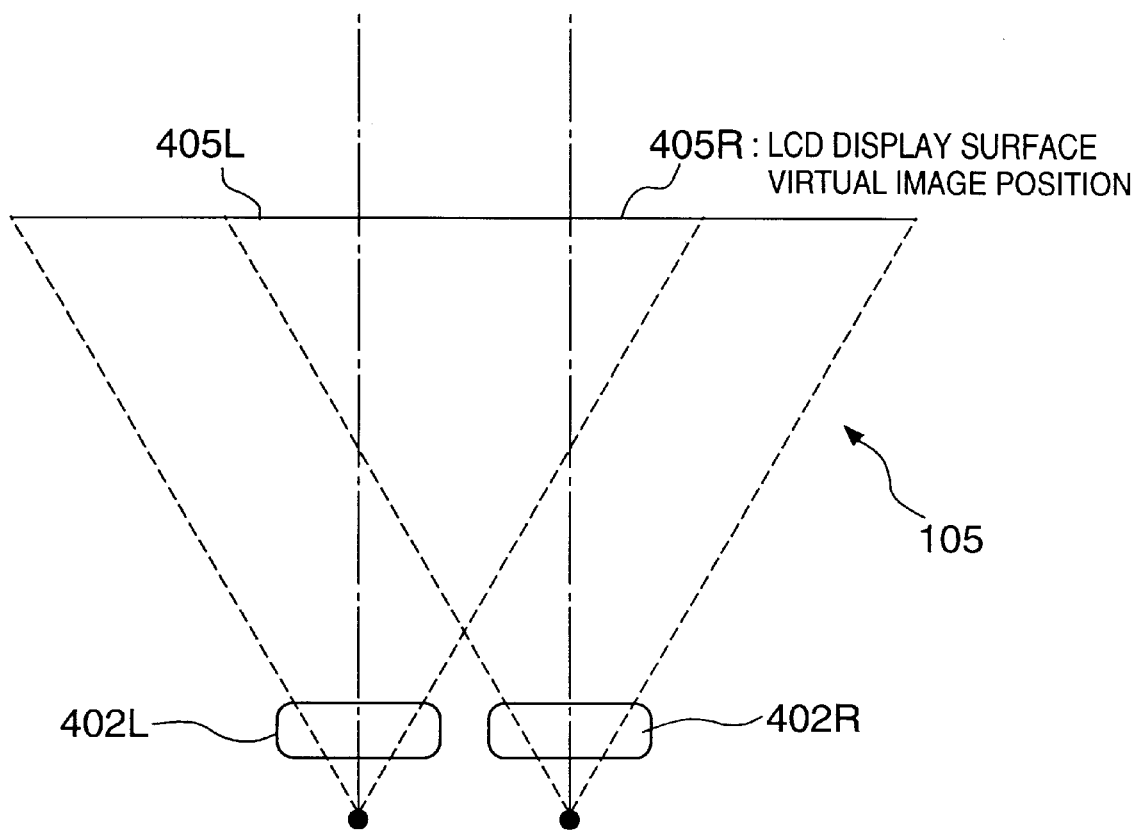
FIG. 7 is an explanatory view for explaining the theory of stereoscopic viewing in the three-dimensional shape information input apparatus shown in FIG. 3.

In the present embodiment, as shown in FIGS. 6 and 7, the viewer views the left and right separate images, displayed on two LCD (Liquid Crystal Display) 401R and 401L, through prism-type eyepieces 402R and 402L which serve as optical systems provided separately for the left and right eyes. As a result, a virtual image is displayed in the corresponding positions 405R and 405L on the display surface. It is schemed such that the virtual image displayed on the display surface of the LCDs 401R and 401L is separated and inputted respectively to the left and right eyeballs 303 and 304.

It is understood in general that the above-described binocular fusion is involuntarily performed by human brains which performs natural pattern matching of the left and right images.

The present invention extracts corresponding points of an image by making use of the binocular fusion, the natural ability of a human being, i.e., a user. More specifically, lines of sight of a viewer, fused at the point of interest, respectively indicate corresponding points of the point of interest on the left and right images. Therefore, by detecting the lines of sight of the viewer (user), coordinates of corresponding points of the point of interest on the left and right images can be obtained. Since coordinates of corresponding points of the point of interest on the left and right images are obtained, three-dimensional coordinates of the point of interest (i.e. shape information) can be obtained by trigonometry.

Three-dimensional shape information of a point of interest can be derived from the line-of-sight data in the foregoing manner.

Figure 8:
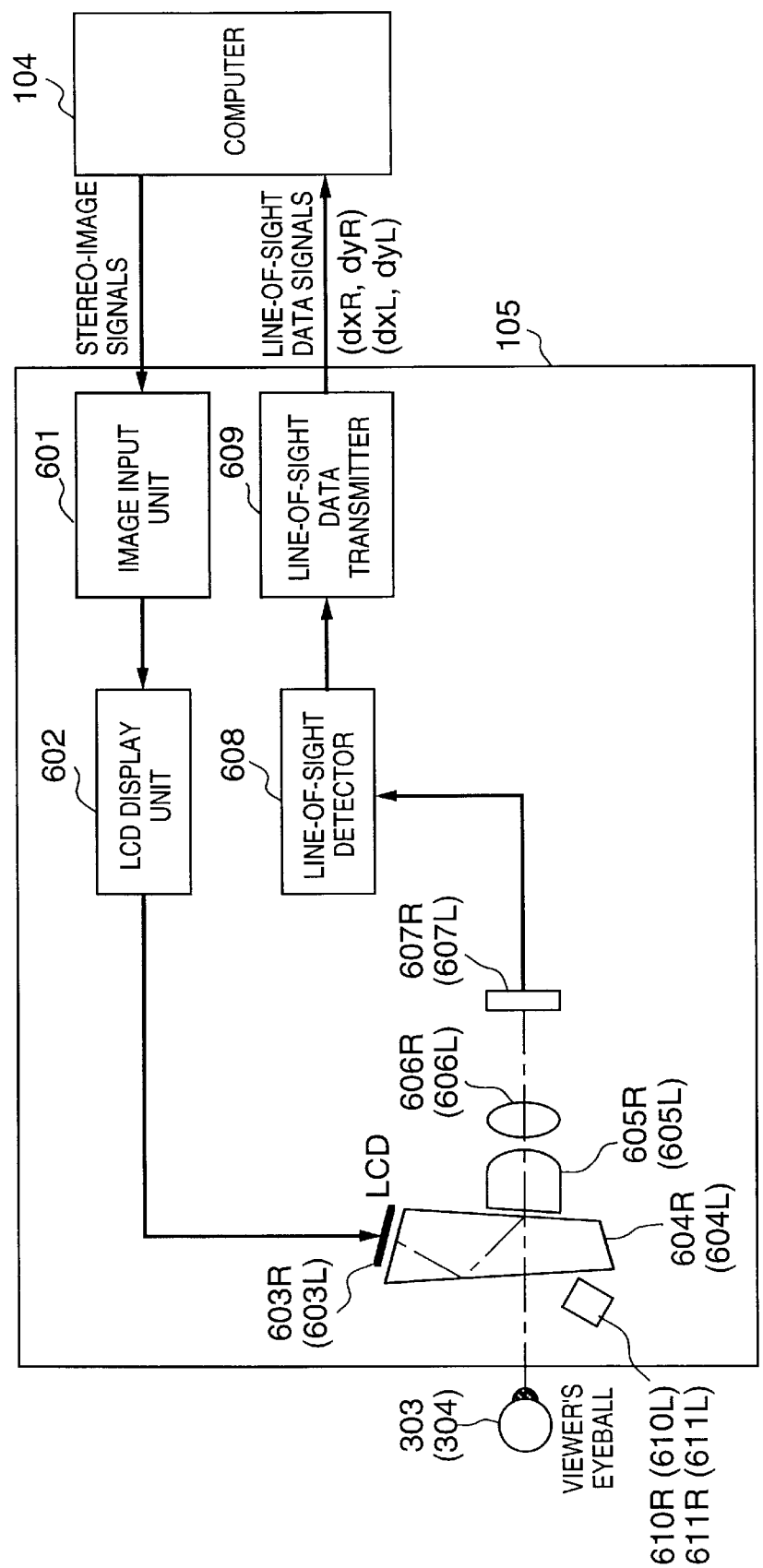
FIG. 8 is a block diagram showing a construction of a line-of-sight detecting device according to the first embodiment.

Next, detailed description will be provided with reference to FIG. 8, on the stereo-image display device and the line-of-sight detecting device.

FIG. 8 is a block diagram showing detailed constructions of the stereo-image display device 105 and line-of-sight detecting device 107, and the connection between these devices. In FIG. 8, the stereo-image display device 105 has a main body, inclusive of a stereo-image display function and a line-of-sight detecting function, which is mounted on the head of a viewer. The stereo-image display device 105 is normally called an HMD (Head Mount Display).

First, the stereo-image display system is explained.

The stereo-image display system comprises: an image input unit 601, an LCD display unit 602, two LCDs (display devices) 603R and 603L provided for the right and left eyes (in FIG. 6, 401R and 401L), and two prism-type eyepieces 604R and 604L provided for the right and left eyes (in FIGS. 6 and 7, 402R and 402L).

The image input unit 601 inputs stereo image signals from the computer 104, and the LCD display unit 602 displays stereo images on the two LCDs 603R and 603L provided for the right and left eyes. The stereo images, displayed respectively on the LCDs 603R and 603L, are guided to an appropriate position before the viewer as a virtual image, by the two prism-type eyepieces 604R and 604L provided for the right and left eyes, and images are formed on retinas of the eyeballs 303 and 304 (see FIGS. 6 and 7).

Next, the line-of-sight detecting system is explained.

The line-of-sight detecting device 107 comprises: four (i.e., two pairs of) infrared ray emission diode (IR-ED) 610R (610L) and 611R (611L) for irradiating eyeballs, two eyeball image pickup optical systems 605R and 605L, two eyeball image pickup devices 607R and 607L, a line-of-sight detector 608, and a line-of-sight data transmitter 609. The right eyeball irradiated by the diodes 610R and 611R for the right eyeball (or diodes 610L and 611L for the left eyeball) is picked up by the image pickup device 607R (or 607L), and the images of the left and right eyeballs are transferred to the line-of-sight detector 608 for detecting a line of sight.

The line-of-sight detecting device 107 having the foregoing construction is well known. The theory of detecting a line of sight will be briefly explained with reference to FIGS. 8 and 9.

Figure 9A:
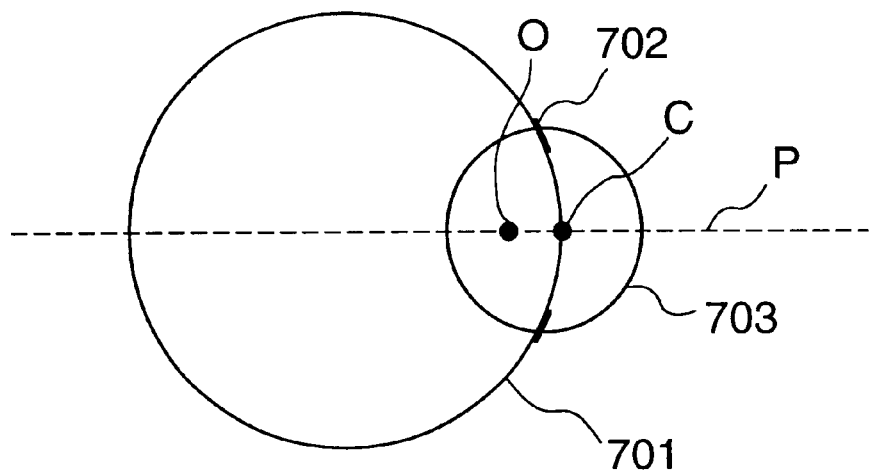
FIGS. 9A and 9B are explanatory views for explaining a theory of detecting a line of sight in the three-dimensional shape information input apparatus according to the first embodiment.
Figure 9B:
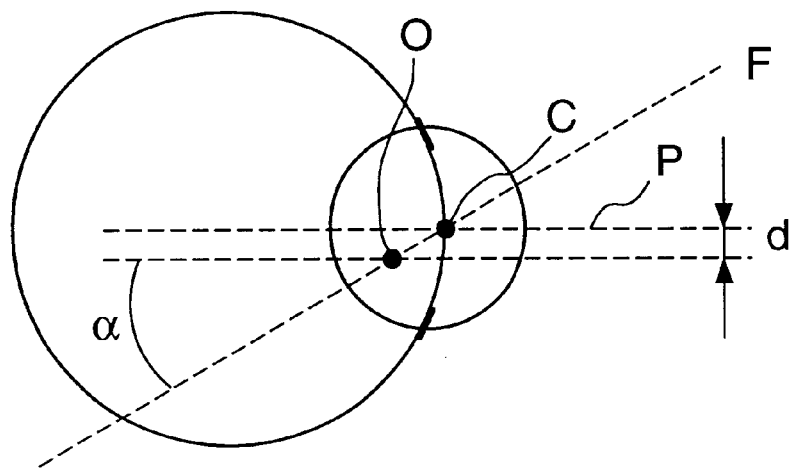

FIG. 9A is a schematic view of a left or right eyeball when a viewer is looking at the center, for showing relations of parts of the eyeball, and FIG. 9B is a schematic view of the eyeball when a viewer is looking to the left, for showing relations of parts of the eyeball. In FIGS. 9A and 9B, reference numeral 701 denotes an eyeball; 702, an iris; and 703, cornea. Reference letter C denotes the center of the pupil, and O denotes the center of cornea curvature. The straight lines P and F, connecting the pupil center C and the cornea curvature center O, indicate respective optical axes of the eyeball of the viewer, looking at the center and the left. In FIG. 9B, a reference letter $\alpha$ indicates a deviation angle of the eyeball optical axis line F with respect to the straight line P, and d indicates a distance from the pupil center C to the cornea curvature center O in the direction perpendicular to the straight line P.

Figure 10A:
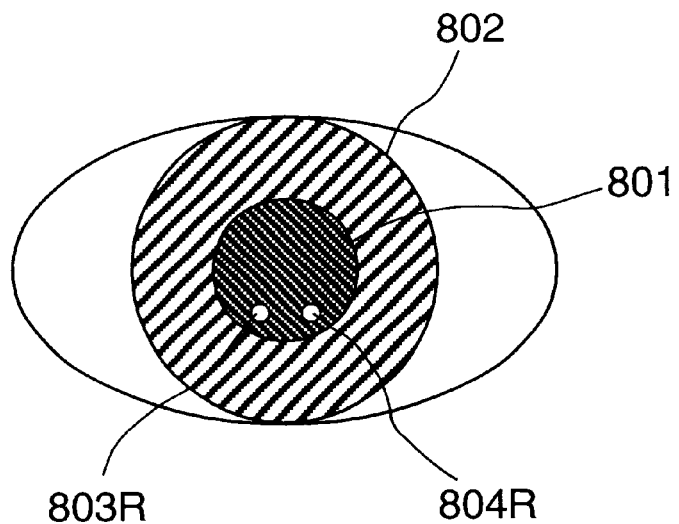
FIGS. 10A and 10B are explanatory views for explaining the theory of detecting a line of sight in the three-dimensional shape information input apparatus according to the first embodiment.
Figure 10B:
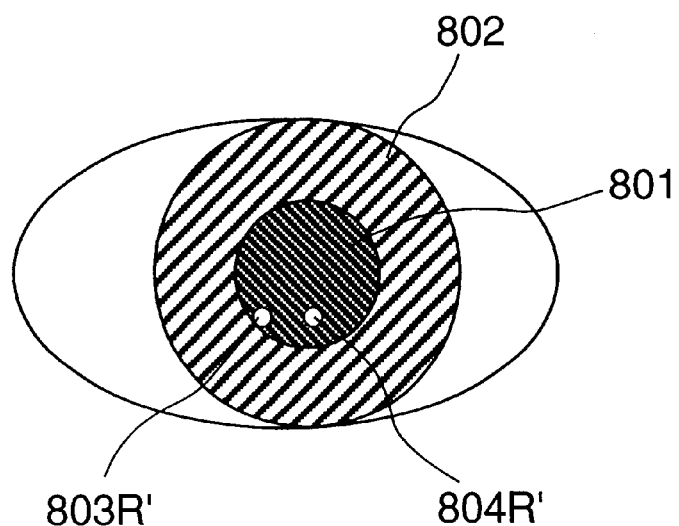
Figure 11:
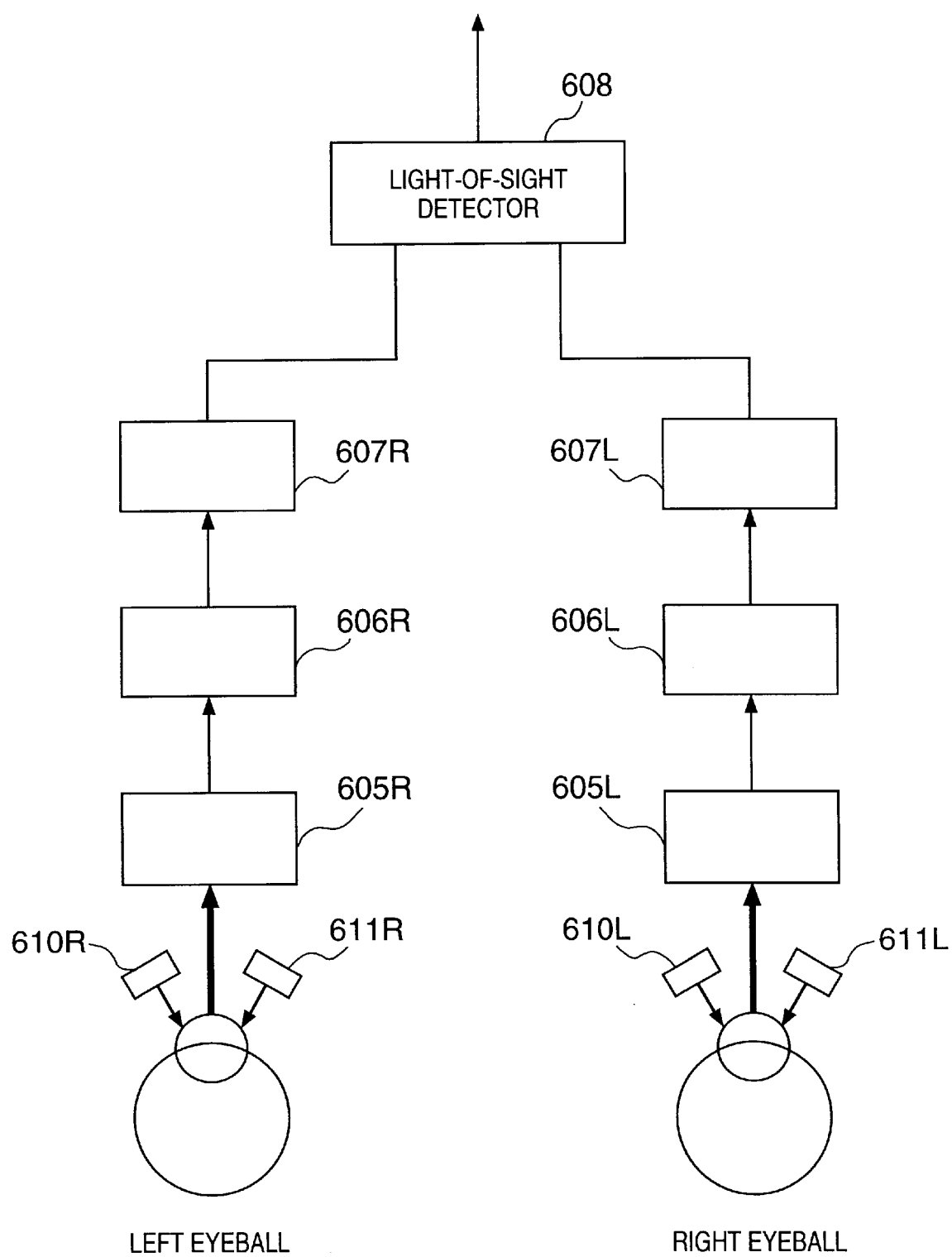
FIG. 11 is an explanatory view for explaining the theory of detecting a line of sight in the three-dimensional shape information input apparatus according to the first embodiment.

FIG. 10A is a schematic view of an image of the right eyeball when a viewer is looking at the center, and FIG. 10B is a schematic view of an image of the right eyeball when the viewer is looking to the left. In FIGS. 10A and 10B, reference numeral 801 denotes a pupil image; and 802, an iris image. The right eye is irradiated by the infrared ray emission diodes 610R and 611R as described above. The light emitted by the diodes is reflected by the cornea 703, and images are formed on the pupil as virtual images 803R and 804R. More specifically, the eyeball 303 (or 304) of the viewer is irradiated by a pair of infrared ray emission diodes 610R and 611R (or 610L and 611L) provided in symmetry with respect to the eyeball, and picked up by the eyeball image pickup optical systems 605R (or 605L), 606R (or 606L) and eyeball image pickup device 607R (or 607L). FIG. 11 shows the process of picking up an image of the right eyeball.

When the viewer looks to the left, the images formed on the pupil irradiated by the diodes provided for the right eyeball are detected as 803R' and 804R' as shown in FIG. 10B.

As shown in FIGS. 9A and 9B, the deviation angle α in the direction parallel to the eyeball optical axis F is determined by a difference d between the pupil center C and the cornea curvature center O, and a distance |CO| from the pupil center C to the cornea curvature center O.

The pupil center C is determined by analyzing the picked-up image of the eyeball and obtaining the center point of the image area of the eyeball 701. The cornea curvature center O is determined by the positions (803 and 804) of virtual images obtained by reflecting light of the infrared ray emission diode to the cornea. Therefore, the difference d between the pupil center C and the cornea curvature center O is obtained by analyzing the picked-up image of the eyeball.

Meanwhile, the distance |CO| from the pupil center C to the cornea curvature center O is an unknown factor which depends upon individuals. The eyeball optical axis F at the time of looking at the center does not normally match a straight gaze axis which is a line connecting the eyeball center to the center point of the front, but makes an angle with respect to the straight gaze axis. This angle is also an unknown factor which depends upon individuals. These unknown factors which depend upon individuals are used as two correction factors when a line-of-sight angle is calculated from the picked-up eyeball image.

Figure 12:
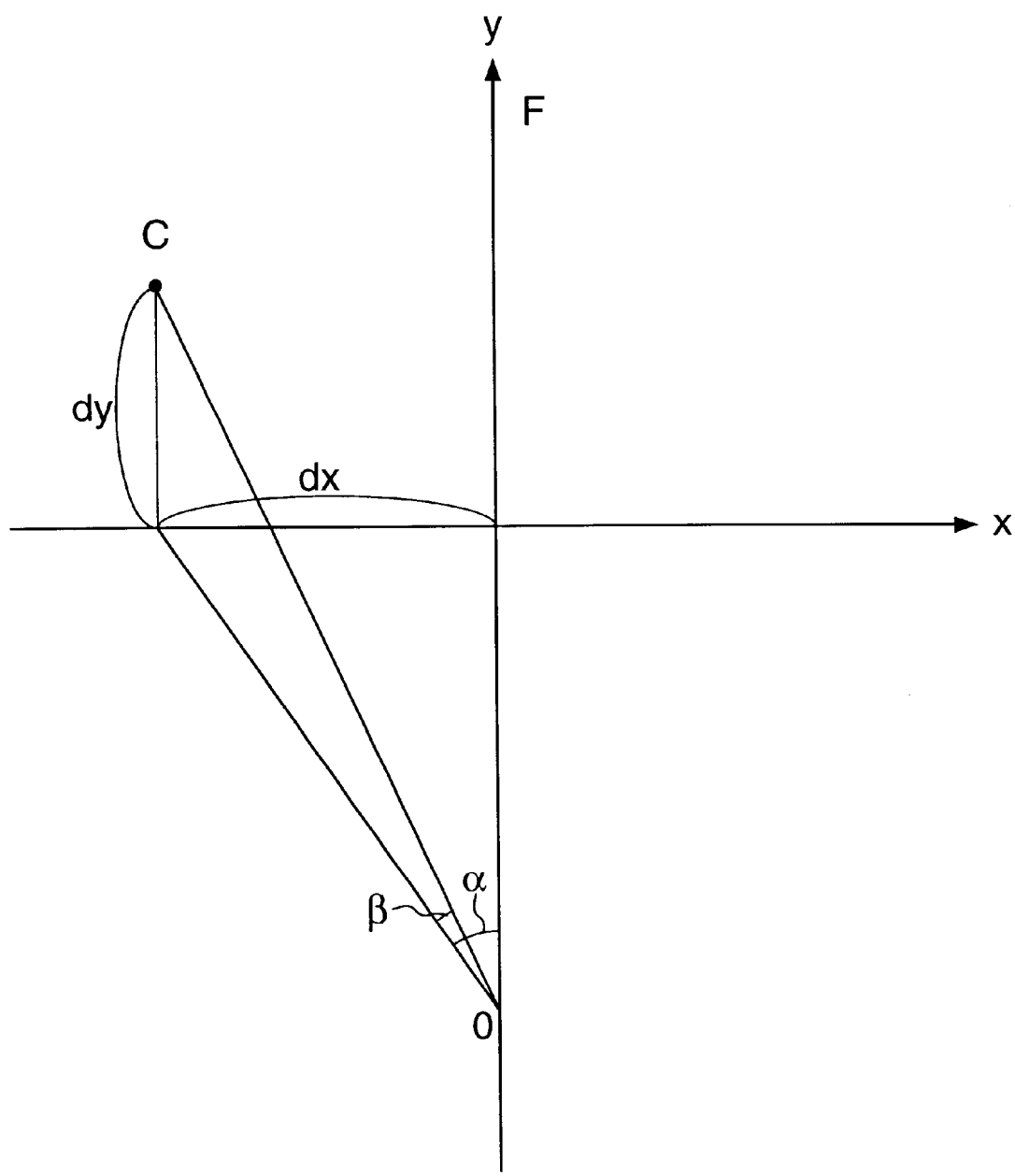
FIG. 12 is a view explaining a rotation angle of an eyeball according to the first embodiment.

As shown in FIG. 12, a line-of-sight angle $\alpha_R$ of, e.g., the right eye, with respect to the horizontal direction is expressed by the following equation (1) as a function of a horizontal distance $d_{xR}$ from the pupil center $C_R$ to the cornea curvature center $O_R$ and correction terms $C_{1R}$ and $C_{2R}$:

$$\alpha_R = \arcsin(d_{xR} \times C_{1R}) - C_{2R} \quad (1)$$

Similarly, a line-of-sight angle $\beta_R$ of the eye with respect to the vertical direction is expressed by the following equation (2) as a function of a vertical distance $d_{yR}$ from the pupil center $C_R$ to the cornea curvature center $O_R$ and correction terms $C_{3R}$ and $C_{4R}$:

$$\beta_R = \arcsin(d_{yR} \times C_{3R}) - C_{4R} \quad (2)$$

With respect to the left eye, the line-of-sight angles $\alpha_L$ and $\beta_L$ can be similarly obtained from distances $d_{xL}$ and $d_{yL}$ between the pupil center $C_L$ and cornea curvature center $O_L$, and correction terms $C_{1L}$, $C_{2L}$, $C_{3L}$ and $C_{4L}$.

The correction terms $C_{1R}$, $C_{2R}$, $C_{3R}$, $C_{4R}$, $C_{1L}$, $C_{2L}$, $C_{3L}$, and $C_{4L}$ are determined in the correction processing which is executed each time an individual's eye direction is detected.

To perform correction processing, two points (or markers), whose positions are known, are displayed on a display, the viewer gazes at the two points, the eyeball image of the viewer is picked up, and the picked-up eyeball image is analyzed for detecting an eyeball rotation angle. Note that in order to improve the precision of correction terms, it is preferable that the two points displayed before the viewer be separated in the left and right view. Once the correction terms are determined, the line-of-sight angle can be calculated any time based on the picked-up eyeball image information.

By performing the above-described processing with respect to the left and right eyeballs, it is possible to obtain the lines of sight of the left and right eyeballs.

In the present embodiment, the line-of-sight detector 608 shown in FIG. 8 calculates $d_x$ and $d_y$. The calculated $d_x$ and $d_y$ are transmitted to the computer 104 by the line-of-sight data transmitter 609, and the above equations (1) and (2) are calculated by programs in the computer 104. Note that the equations (1) and (2) may be calculated by the line-of-sight detector 608, instead of by the programs in the computer 104.

In the following description, data outputted by the line-of-sight detecting device 107 will be referred to as "line-of-sight data." More specifically, the horizontal distance and vertical distance $(d_{xL}, d_{yL})$ between the pupil center $C_L$ and cornea curvature center $O_L$ with respect to the left eyeball 303, and the horizontal distance and vertical distance $(d_{xR}, d_{yR})$ between the pupil center $C_R$ and cornea curvature center $O_R$ with respect to the right eyeball 304 are referred to as line-of-sight data.

Figure 13:
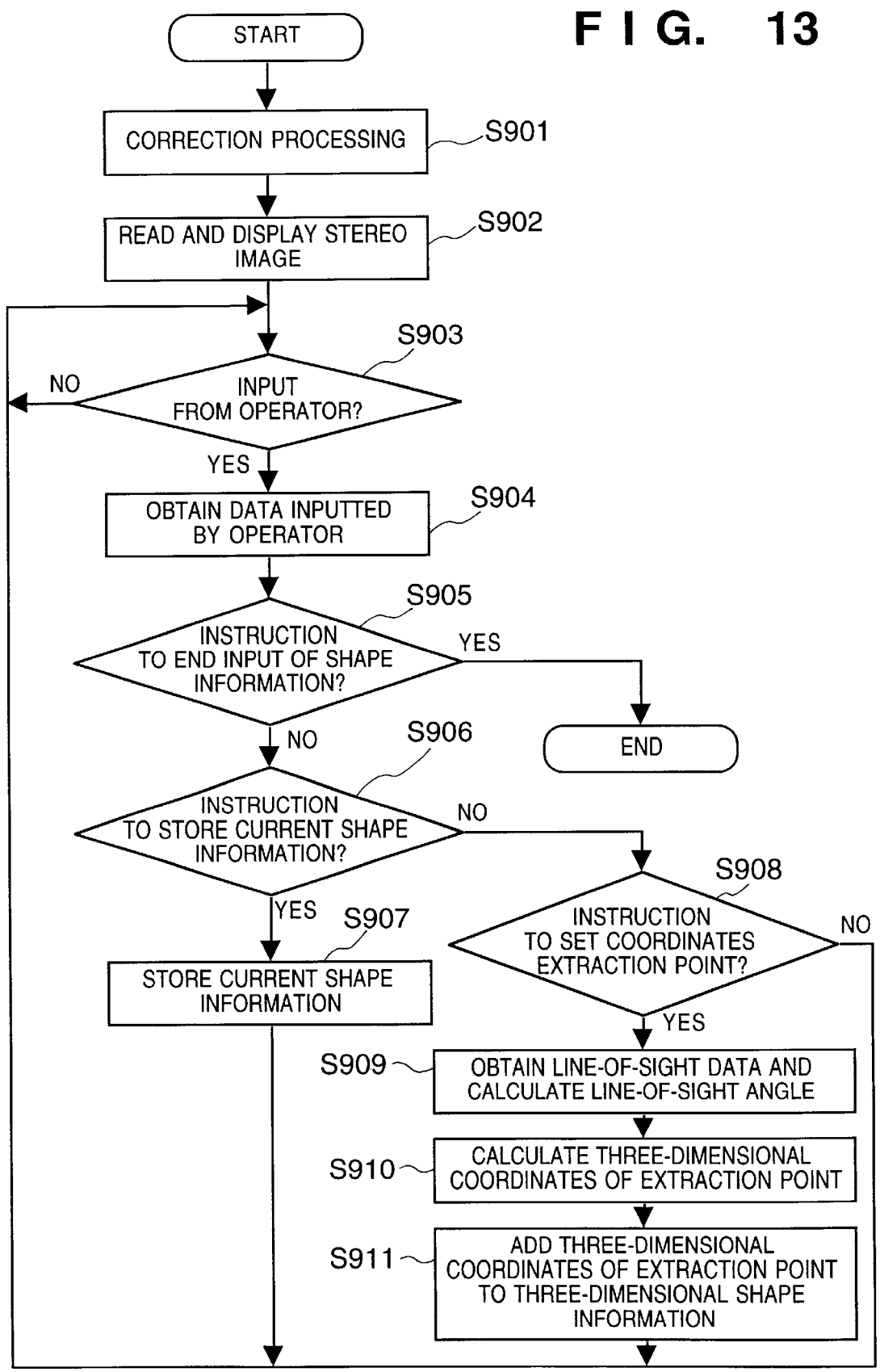
FIG. 13 is a flowchart showing the control steps according to the first embodiment.

Next, description will be provided, with reference to the flowchart in FIG. 13, on the steps of inputting three-dimensional shape information by the three-dimensional shape information input apparatus according to the present embodiment.

In step S901, the aforementioned correction terms ($C_{1R}$, $C_{2R}$, $C_{3R}$, $C_{4R}$, $C_{1L}$, $C_{2L}$, $C_{3L}$, $C_{4L}$) are obtained. As described in the above section "theory of detecting line of sight," since correction terms which depend upon individuals must be determined to detect a line of sight, correction processing is first performed prior to inputting three-dimensional shape information. In the correction processing, the computer 104 displays two reference markers for correction on the stereo-image display device 105, and allows a viewer to gaze at the markers. Data outputted by the line-of-sight detecting device 107 at this stage is obtained as line-of-sight data $d_x$ and $d_y$. The positions where the reference markers are displayed, i.e., reference line-of-sight angles $\alpha_0$ and $\beta_0$ obtained when the viewer gazes at the markers, are accurately known. By substituting the reference angles $\alpha_0$ and $\beta_0$ and the obtained line-of-sight data $d_{x0}$ and $d_{y0}$ into the equations (1) and (2), correction terms ($C_{1R}$, $C_{2R}$, $C_{3R}$, $C_{4R}$, $C_{1L}$, $C_{2L}$, $C_{3L}$, $C_{4L}$) are determined. Note that although the correction terms in this case are determined by the measuring operation performed at two points per eye, two or more points may be measured and the least squares method may be applied to the measured values to obtain the correction terms.

Next in step S902, stereo image data is read from the stereo-image pickup device 100 (or recording medium 208 on which a stereo image is recorded).

In a case where stereo image data is directly read from the stereo-image pickup device 100, stereo image data is read through the image signal input unit 201 and inputted to the image memory 203 of the computer 104. The digital cameras 101 and 102, employed by the stereo-image pickup device 100, normally outputs the picked up stereo image data through serial interface, or as analogue video signals for TV. In a case of using a serial interface, the image signal input unit 201 serves as a serial line controller, while in a case of using analogue video signals for TV, the image signal input unit 201 serves as an analogue/digital conversion controller. In a case where stereo image data is read from the recording medium 208 such as a magneto optical disk or the like, the stereo image data is read through the recording medium loading device 209 connected as a peripheral device of the computer 104. Note that the stereo image data may be inputted to the computer 104 and stored in hard disk or the like in advance. In such case, stereo image data is read from the hard disk and stored in the image memory 203.

When the stereo image data is written in the image memory 203, image data for the left and right eyeballs are converted to image signals by the image signal output unit 204 and outputted to the stereo-image display device 105. The image signals, in which the left and right images are interlaced and combined, are outputted to the stereo-image display device 105 as NTSC interlaced signals.

The stereo-image display device 105 receives the NTSC interlaced signals, separates the left and right images, and displays the images for the right eye and the left eye respectively on the LCDs 603R and 603L provided respectively for the right eye and left eye. Instead of NTSC interlaced signals, image signals dedicated to the present apparatus may be used and an independent signal line may be used for the left and right images.

By the foregoing processing, a stereo image is displayed on the stereo-image display device 105; as a result, a viewer who gazes at the stereo-image display device 105 views a stereo image. In this state, images seen by both eyeballs are fused as described above.

In step S903, the process awaits for an input from an operator. The input is performed by using the input devices of the computer 104, such as mouse 206 or keyboard 207. When the operator performs input operation, the inputted data is obtained in step S904, and determination is made in step S905 as to whether or not the inputted data instructs to end the input operation of three-dimensional shape information.

When the operator instructs to end the input operation of three-dimensional shape information, the present process ends. Although the process may simply end here, in a case where the input operation of three-dimensional shape information has been performed for a long period of time, the apparatus may suggest the operator to store the current three-dimensional shape information, and the processing for storing three-dimensional shape information which will be described later may be performed before ending the present process.

Meanwhile, in step S905, in a case where a user's instruction to end the input operation of three-dimensional shape information is not received, determination is made in step S906 as to whether or not the user has instructed to store the current three-dimensional shape information. This function is provided to store three-dimensional shape information at an arbitrary point of time. Input operation of three-dimensional shape information occasionally consumes a large amount of time. In such case, it is convenient to have the function to store the current operation state when an operator wishes to halt the operation, and restart later. When the operator instructs to store the current three-dimensional shape information in step S906, in the next step S907, contents of the three-dimensional shape information which are currently generated, and information used as a data source to designate the stereo image, e.g., the name of file or the like, are stored in a memory such as hard disk, and the process returns to step S903.

Meanwhile, when the operator does not instruct to store the current three-dimensional shape information in step S906, the process proceeds to step S908 where determination is made as to whether or not the user instructs to set the current point of interest as coordinates extraction point. In other words, determination is made as to whether or not a user instructs to adopt the current point of interest as a vertex to characterize the three-dimensional shape. The operator is aware that the current point of interest is a representative point for extracting a three-dimensional shape. Therefore, operator's instruction (YES) in step S908 is equivalent to instructing the computer 104 to set the current point of interest on the display device 105 as the extraction point.

If the user does not instruct to set a coordinates extraction point in step S908, the process returns to step S903.

If the user instructs to set a coordinates extraction point in step S908, the line-of-sight data is obtained and a line-of-sight angle is calculated in the next step S909. The Line-of-sight data ($d_x$, $d_y$) is periodically transmitted by the line-of-sight detecting device 107, and received by the line-of-sight data input unit 205 of the computer 104. To obtain the line-of-sight data, the CPU 210 reads the latest line-of-sight data received by the line-of-sight data input unit 205. Upon obtaining the line-of-sight data ($d_x$, $d_y$), line-of-sight angles ($\alpha_R$, $\beta_R$, $\alpha_L$, $\beta_L$) are calculated with respect to the left and right data, using the aforementioned equations (1) and 2). The correction terms of the equations (1) and 2) have already been determined in step S901.

When the coordinates extraction point is set and the left and right line-of-sight angles ($\alpha_R$, $\beta_R$, $\alpha_L$, $\beta_L$) for the point of interest are prepared in the foregoing manner, i.e., when a pair of corresponding points are set, three-dimensional coordinates of the corresponding points are calculated in step S910 as the extraction points. The left and right line-of-sight angles ($\alpha_R$, $\beta_R$, $\alpha_L$, $\beta_L$) obtained in step S909 are converted into the two-dimensional coordinate system of the extraction points on the left and right images, by using the following equations (3) to (6):

$$X_L = L \times \tan \alpha_L \tag{3}$$

$$Y_L = L \times \tan \beta_L \tag{4}$$

$$X_R = L \times \tan \alpha_R \tag{5}$$

$$Y_R = L \times \tan \beta_R \tag{6}$$

Herein, $\alpha_L$, $\beta_L$, $\alpha_R$, $\beta_R$, $X_L$, $Y_L$, $X_R$, $Y_R$ and L are defined as follows:

$\alpha_L$: rotation angle with respect to Y axis for a left-eyeball optical axis $\beta_L$: rotation angle with respect to X axis for a left-eyeball optical axis $\alpha_R$: rotation angle with respect to Y axis for a right-eyeball optical axis $\beta_R$: rotation angle with respect to X axis for a right-eyeball optical axis $X_L$: X coordinate of an extraction point on the left-eye image $Y_L$: Y coordinate of an extraction point on the left-eye image $X_R$: X coordinate of an extraction point on the right-eye image $Y_R$: Y coordinate of an extraction point on the right-eye image L : distance from an eyeball to a display surface Based on a pair of two-dimensional coordinates $(X_L, Y_L)$ and $(X_R, Y_R)$ of an extraction point on the left and right images, three-dimensional coordinates $(X_c, Y_c, Z_c)$ of the extraction point in the three-dimensional space are obtained by the following equations (7) to (9):

$$X_C = X_L \times t \quad (7)$$

$$Y_C = Y_L \times t \quad (8)$$

$$Z_C = L \times t \quad (9)$$

Where t is defined by $$t = \frac{D}{X_L - X_R},$$

and D indicates a distance (base length) between the left and right eyeballs. In the foregoing manner, three-dimensional coordinates of an extraction point (representative point) are obtained.

Next, the process proceeds to step S911 where the three-dimensional coordinates $(X_c, Y_c, Z_c)$ of the extraction point generated in step S910 are added to the three-dimensional shape information 109 as a new vertex to define the shape of the object. Then, the process returns to step S903.

Figure 14:
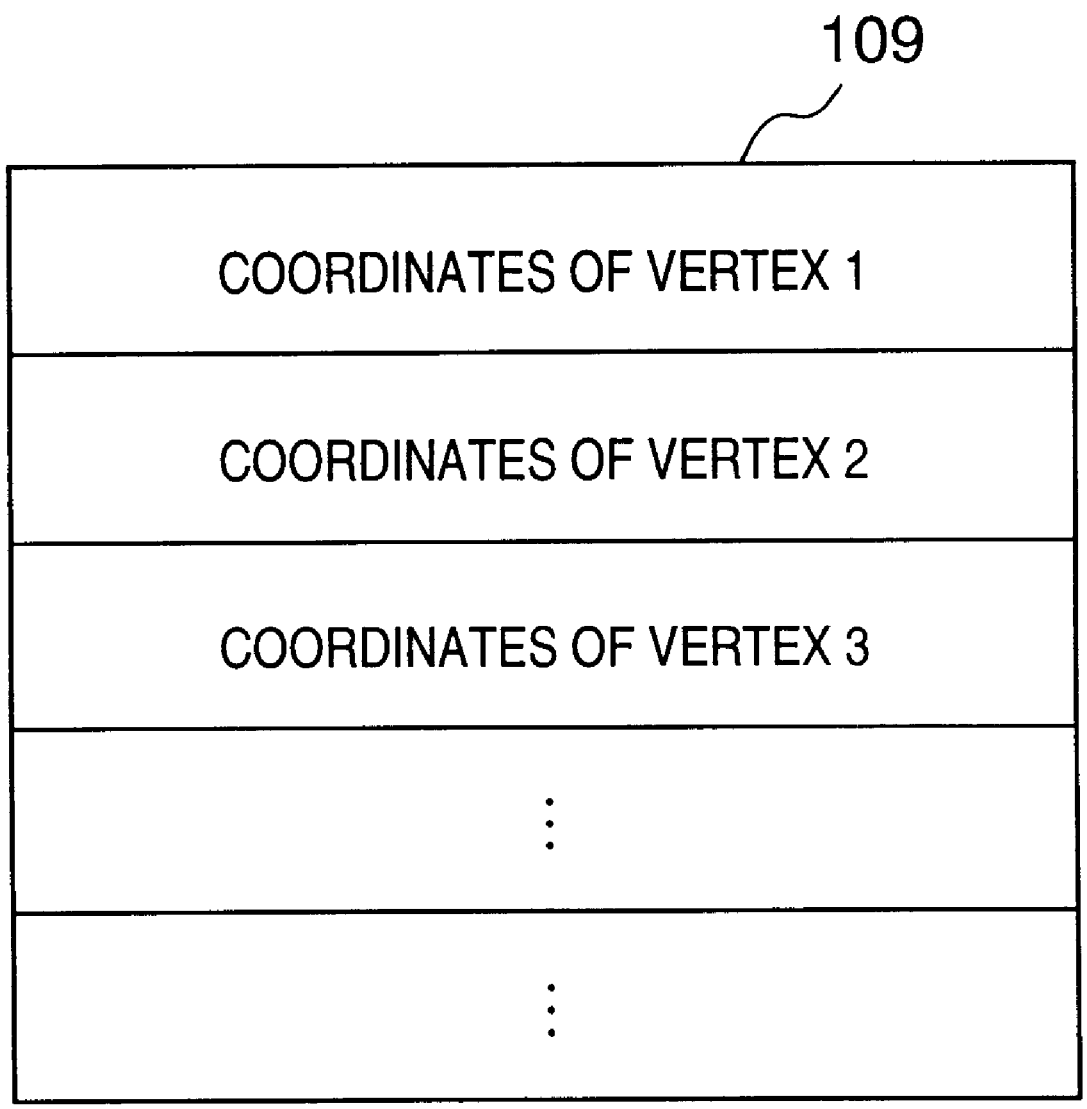
FIG. 14 is a table showing a data structure of three-dimensional shape information.

The three-dimensional shape information 109 includes three-dimensional coordinates of a vertex as an element as shown in FIG. 14, and comprises the elements as many as the number of vertices. Normally, in the field of software, such structure is called a table. Hereinafter, the structure will be referred to as a vertex data table. As the new vertex is generated and added as three-dimensional shape information to the table, the number of elements increases in the vertex data table. During input operation of three-dimensional shape information, the vertex data table is stored in the image memory 203 of the computer 104, and when the input operation of three-dimensional shape information is completed, the table is stored in a memory medium such as hard disk or the like.

As set forth above, three dimensional shape information is inputted by utilizing the inputted line of sight, and object shape information is generated.

Second Embodiment

The second embodiment of the present invention will now be described with reference to FIGS. 11 and 12.

In the steps of inputting three-dimensional shape information described in the first embodiment, an operator instructs the system to set the point of interest, where an operator is currently gazing at on the display device 105, as a new extraction point. The instruction is made by using an input device such as the mouse 206 or keyboard 207 or the like, as described before. In the second embodiment, setting a point of interest is not instructed by a user, but performed automatically. More specifically, when the line of sight of an operator stops for a predetermined period of time, it is determined that the operator has selected the point as a coordinates extraction point. In the second embodiment, determination of whether or not to set the point is performed automatically in this manner. Method thereof is described with reference to the flowcharts in FIGS. 15 and 16.

Figure 15:
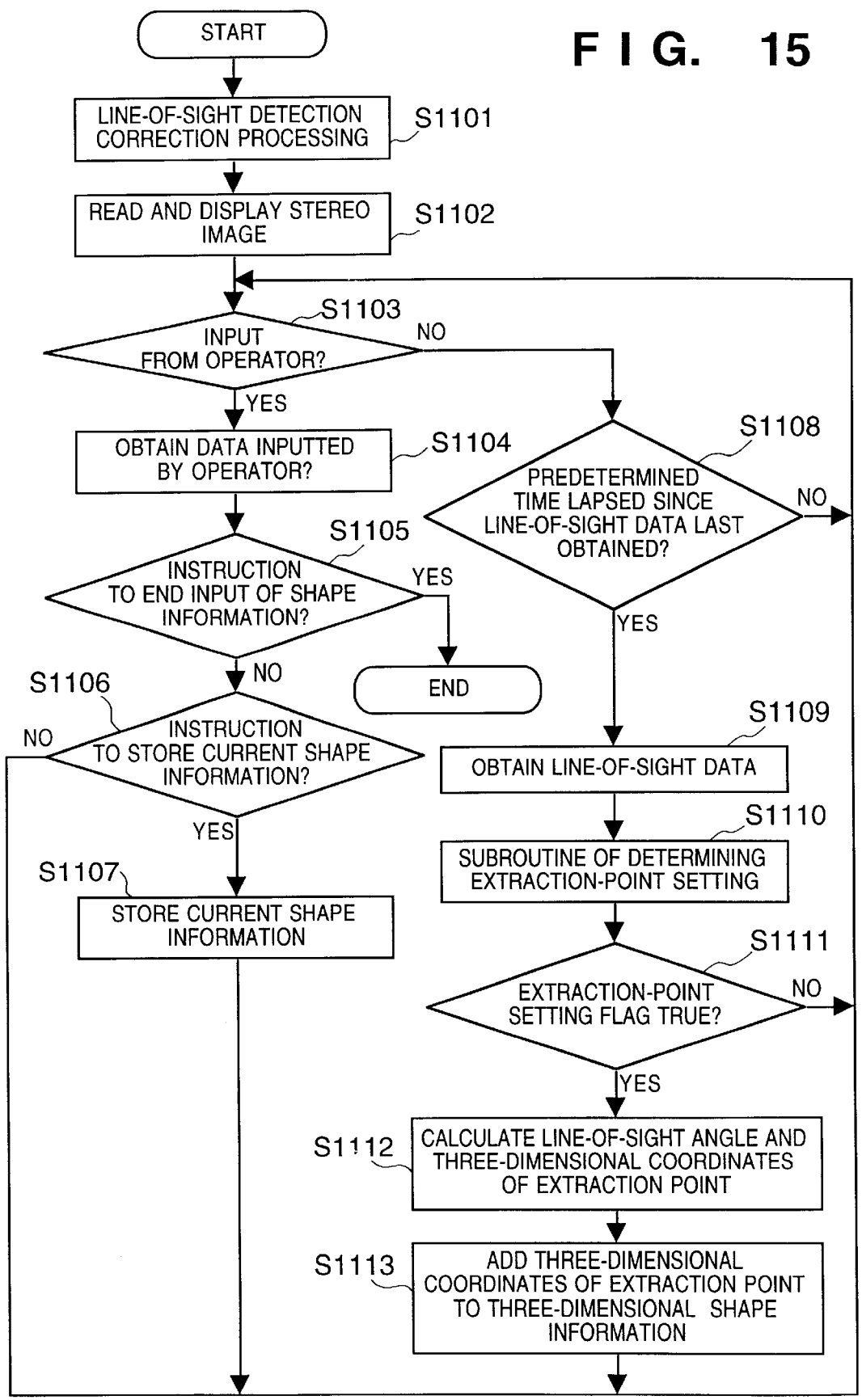
FIG. 15 is a flowchart showing the steps of inputting three-dimensional shape information by a three-dimensional shape information input apparatus according to the second embodiment of the present invention.

Note that steps S1101, S1102, S1104–S1107 and S1113 in FIG. 15 are identical to steps S901, S902, S904–S907 and S911 in FIG. 13. Thus, description thereof will not be provided herein. Hereinafter, the steps characteristic to the second embodiment are described.

Unlike the steps in FIG. 13, the steps of determining an input of the coordinates extraction point set instruction (step S908 in FIG. 13) is eliminated in the control steps in FIG. 15, but line-of-sight data is obtained every predetermined period.

Figure 16:
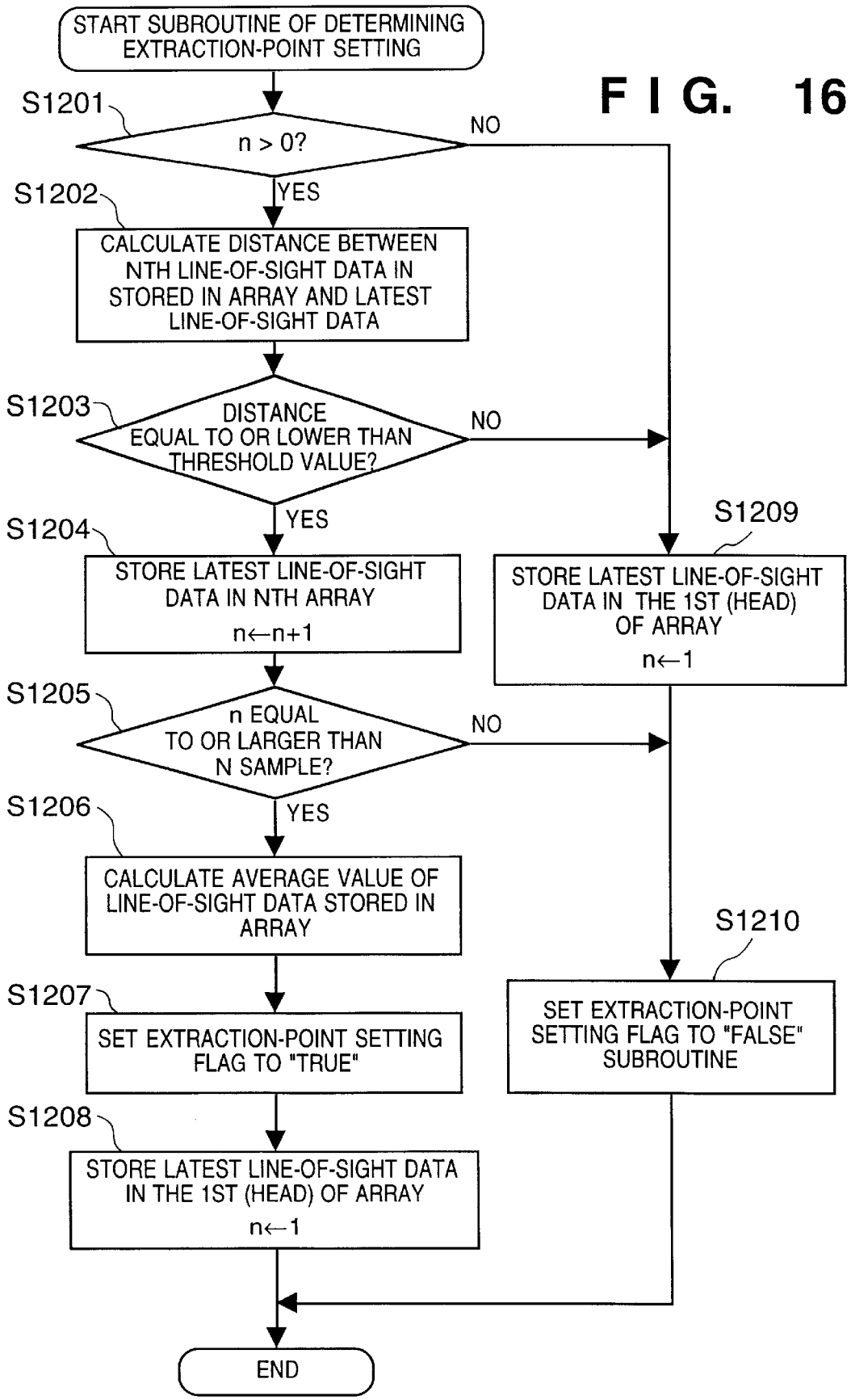
FIG. 16 is a flowchart showing the steps of inputting three-dimensional shape information according to the second embodiment.

More specifically, in a case it is determined that there is no input by an operator in step S1103, determination is made in step S1108 as to whether or not a predetermined time Δt has lapsed since the line-of-sight data was last obtained. If the predetermined time has lapsed, line-of-sight data is obtained in step S1109 and a subroutine shown in FIG. 16 is executed in step S1110 for determining extraction point setting. In the subroutine of determining extraction point setting, if the line of sight does not move for a predetermined period of time (i.e. if it is detected that an operator is gazing at a point of interest for more than a predetermined time), the point is set as an extraction point without being instructed by the operator. The operator's gaze for more than a predetermined time period indicates that the operator acknowledges the point as an extraction point (representative point).

Hereinafter, the subroutine of determining extraction point setting, executed in step S1110, is described with reference to FIG. 16.

Figure 17:
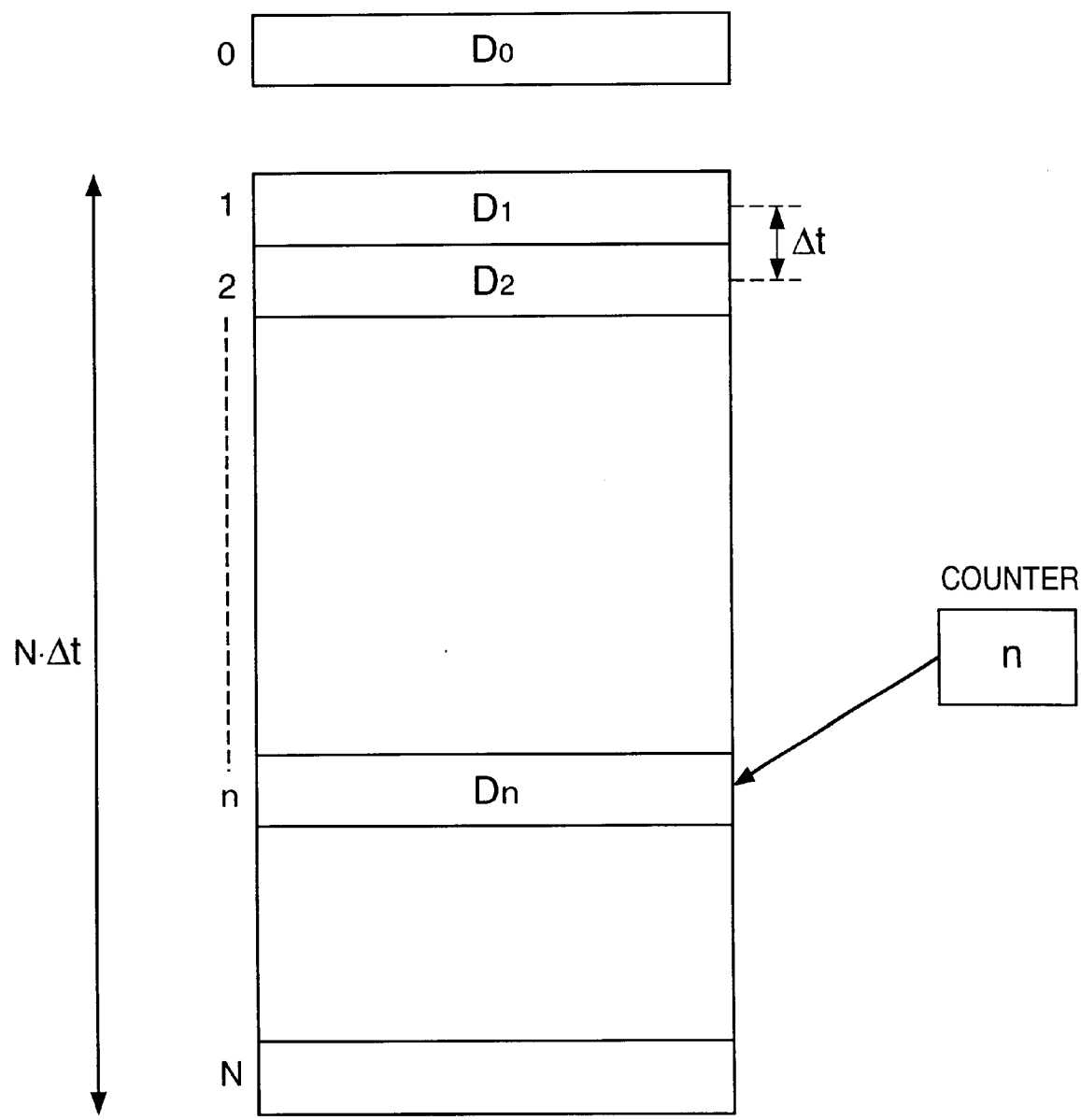
FIG. 17 is an explanatory view for explaining a theory of determining the timing for setting line-of-sight data according to the second embodiment.

In the automatic determination of extraction point setting, if the position of line of sight does not vary for a predetermined time N×Δt, the computer 104 sets the position of line of sight as an extraction point in place of the operator. However, humans cannot hold the line of sight without fluctuation. Therefore, in the second embodiment, variations in the line of sight within a predetermined fluctuation range are disregarded. When the N number of line-of-sight data within the variation range is detected, the computer determines that the operator wishes to set the point as an extraction point, and an average value of the N number of line-of-sight data is set as an extraction point. For this, in the second embodiment, an array of line-of-sight data is provided for storing the N number of line-of-sight data, and a counter variable n are provided as shown in FIG. 17. The counter variable n is initialized to "0".

First, in step S1201 in FIG. 16, it is confirmed that the counter variable n is larger than 0. Herein, if the counter variable n is 0, it means that the subroutine shown in FIG. 16 is performed for the first time. In this case, the process proceeds to step S1209 where the latest line-of-sight data for the left eye $(d_{xL}, d_{yL})$ and the right eye $(d_{xR}, d_{yR})$, obtained from the line-of-sight data input unit 205, are stored in the head of the line-of-sight data array (FIG. 17), and "1" is substituted for the counter variable n. In the second embodiment, the computer does not set an extraction point until the N number of line-of-sight data is detected. Thus, in step S1210, an extraction point setting flag is set to "false" and the subroutine process ends.

When the subroutine is executed next time (generally, n (≧1) times), since the counter variable n is larger than 0, the process proceeds from step S1201 to step S1202. In step S1202, the current line-of-sight data $(d_x[0], d_y[0])$ is compared with the line-of-sight data stored last time (i.e., the $n^{th}$ line-of-sight data $(d_x[n], d_y[n])$ stored in the line-of-sight data array), and a distance Δl between the two points is obtained by the following equation (10). The calculation of distance and determination made based on the calculated result are performed only on one of the left or right eyeball since the left and right eyeballs move in synchronization.

$$\Delta l = \sqrt{(d_x[0] - d_x[n])^2 + (d_y[0] - d_y[n])^2} \quad (10)$$

In step S1203, it is determined whether or not the distance Δl obtained by the equation (10) is equal to or less than a threshold value. In a case the distance Δl is equal to or less than the threshold value, it is determined that the motion of eyeball is in the gazing state. Then in step S1204, the current line-of-sight data ($d_x[0]$, $d_y[0]$) is stored in the next position (n+1) of the previously stored position in the line-of-sight data array. That is:

$$d_x[n+1]=d_x[0]$$

$$d_y[n+1]=d_y[0] \quad (11)$$

At the same time, the counter variable n is incremented by "1" and the process proceeds to the next step S1205.

In step S1205, determination is made as to whether or not the number of data stored in the array is N or more, i.e., whether or not the counter variable n is N or larger. If the counter variable n is N or larger, it indicates that the line of sight has not moved for more than a predetermined period of time N×Δt. In this case, average values of the N number of left and right line-of-sight data ($d_{xL}$, $d_{yL}$) and ($d_{xR}$, $d_{yR}$) stored in the line-of-sight data array, are respectively calculated in step S1206, and the calculated values are stored as the following line-of-sight data corresponding to extraction points:

$$(\{d_{xL}\}_{AV}, \{d_{yL}\}_{AV})$$

$$(\{d_{xR}\}_{AV}, \{d_{yR}\}_{AV}) \quad (12)$$

In step S1207, the extraction point setting flag is set to "true." In step S1208, the counter variable n is reset to the initial value "1" for setting the next extraction point, and the current line-of-sight data is stored as the previous line-of-sight data in the head of the line-of-sight data array. Then, the subroutine process ends.

Meanwhile, if it is determined in step S1203 that the distance obtained by equation (10) is larger than the threshold value, the computer determines that the eyeball of the operator is still in motion, searching for a point to gaze at. Then, the process proceeds to step S1209 where the counter variable n is reset to the initial value "1", and the current line-of-sight data is stored as previous line-of-sight data in the head of the line-of-sight data array.

If the counter variable n has not reached N in step S1205, the computer determines that the extraction point is not set. Then, the process proceeds to step S1210 where the extraction point setting flag is set to "false," and the subroutine process ends.

Upon ending the subroutine of determining extraction point setting, the process returns to the main flow shown in FIG. 15. Then, in step S1111, determination is made as to whether or not the extraction point setting flag is "true." If the extraction point setting flag is "true", the computer determines that the corresponding point is set. Then, the process proceeds to step S1112 where calculation of a line-of-sight angle and calculation of three-dimensional coordinates of the extraction point are performed by using the averaged line-of-sight data:

$$(\{d_{xL}\}_{AV}, \{d_{yL}\}_{AV})$$

$$(\{d_{xR}\}_{AV}, \{d_{yR}\}_{AV})$$

which has been stored in the above-described subroutine of determining extraction point setting. Then, the process proceeds to step S1113 where the three-dimensional coordinates of the extraction point is added to the three-dimensional shape data. Note that the calculation of the line-of-sight angle and the calculation of three-dimensional coordinates of the extraction point executed in step S1112 are performed in the method identical to that of the first embodiment.

If the extraction point setting flag is not "true" but "false" in step S1111, the process returns to step S1103 without performing the calculation of three-dimensional coordinates of the extraction point.

As set forth above, according to the three-dimensional shape information input apparatus of the second embodiment, extraction points of three-dimensional shape can be automatically designated by movement of the line of sight of an operator.

Modified Examples

Various modifications are possible in the present embodiment.

First Modification

For instance, in the above described second embodiment, if the operator gazes at a point for a long time, a non-preferable situation occurs in that the same point is set as an extraction point for a number of times.

Therefore, in order not to set the same point as an extraction point for a number of times even if an operator gazes at the point for a long time, another step is provided between step S1206 and S1207, as step S1206' in FIG. 16, for making determination whether or not the line-of-sight data for a position of point subjected to setting is sufficiently different from the line-of-sight data of the extraction points set before.

More specifically, line-of-sight data corresponding to the extraction points already set in the past are stored in advance. After calculating an average value of the line-of-sight data in the array in step S1206 in FIG. 16, determination is made in step S1206' as to whether or not the line-of-sight position of the calculated average value is a sufficiently different position from the line-of-sight data of extraction points set in the past. If it is determined that the line-of-sight data is sufficiently different, the extraction point setting flag is set to "true" in step S1207, and the data is set as an extraction point.

There is another method of not setting the same point as an extraction point for many times. In step S1113 of the main flow shown in FIG. 15, at the time of adding three-dimensional coordinates data of an extraction point to the three-dimensional shape data, comparison is made between the three-dimensional coordinates data which is about to be added and the extraction points which have already been stored. The three-dimensional coordinates data is added to the three-dimensional shape data only when the three-dimensional coordinates data is a new point.

According to the above methods, extraction points of three-dimensional shape can be automatically designated by movement of the line of sight of an operator, as similar to the foregoing second embodiment.

Second Modification

Although two digital cameras 101 and 102 provided for the left and right eyeballs are used to obtain a stereo image in the first and second embodiments, a single camera may be moved in parallel for a predetermined distance to pick up images at two viewpoints.

Moreover, the camera used is not limited to a digital camera, but may be a silver chloride photograph camera. In this case, the film is developed and the developed film is read by a film scanner or the like to input images into the computer. Further, it is apparent that an arbitrary image pickup device which records an actual image in an arbitrary recording medium is applicable to the present invention.

Third Modification

In the first and second embodiments, the head-mount stereo-image display device 105 integrating the line-of-sight detecting device 107 is utilized. It is used because the relative position between the stereo-image display device 105 and the head position of the viewer is fixed, and enables precise detection of coordinates of a point of interest. However, the stereo-image display device 105 and line-of-sight detecting device 107 may be separated in a case where the head position of the viewer does not change with respect to the stereo-image display device 105, or a case where the apparatus includes function for detecting the amount of change in the head position and means for correcting a coordinates value of the point of interest based on the detected amount of change. More specifically, the present invention may adopt a table-top type interlace display and a pair of liquid crystal shutter glasses, which are often used as a stereo-image display device, or a lenticular-type stereoscopic display without a pair of glasses. Therefore, the present invention can be readily realized by simply wearing a pair of glasses serving as a line-of-sight detecting device.

Fourth Modification

In the above-described embodiments, in order to realize stereoscopic viewing, a distance image or a depth image is generated from a stereo image by detecting a line of sight. However, the present invention is applicable also to a purpose other than stereoscopic viewing. For instance, the present invention can be used for providing a panoramic image. Detecting a joining portion of panoramic images is realized by detecting corresponding points. Therefore, the present invention can be applied to extract corresponding points in panoramic images.

As has been described above, according to the method and apparatus of the present invention for inputting three-dimensional shape information, input operation of three-dimensional shape information is realized by sequentially gazing at an extraction point representing characteristics of the shape by a viewer. Therefore, compared to the conventional operation in which an operator compares left and right images and designates corresponding points one by one with a mouse or the like, operation time and physical pain are greatly reduced. Therefore, the present invention achieves the effect of efficient operation for inputting three-dimensional shape information.

The present invention is not limited to the above embodiments and various changes and modifications can be made within the spirit and scope of the present invention. Therefore, to appraise the public of the scope of the present invention, the following claims are made.

What is claimed is:

1. A method of identifying three-dimensional coordinates of points of interest on a plurality of images obtained from an object, comprising the steps of:

presenting to a user a left image and a right image as a stereo image;

detecting left and right gazing points corresponding to left and right lines-of-sight on the left and the right image, of eyes of the user, respectively; and calculating three-dimensional coordinates of a point of interest at which the user is gazing, based on the detected left and right gazing points and a convergence angle between the left and right lines of sight.

2. The method according to claim 1, wherein the left and right images presented in said presenting step are images of an object picked up in advance or about to be picked up, by stereo cameras spaced from each other by a base length.

3. The method according to claim 1, wherein the user gazes at a vertex on the stereo image as a point of interest.

4. The method according to claim 1, wherein obtained in said calculating step are:

two-dimensional coordinates of the point of interest in left and right image coordinate systems provided respectively for the left and right images, obtained based on a distance L from an eyeball of the user to a display surface where the left and right images are displayed, and the left and right lines of sight of the eyes of the user, and three-dimensional coordinates of the point of interest, obtained based on obtained coordinates positions of the point of interest in either one of the left and right image coordinate systems, the base length of the user, and a difference of the coordinate positions of the point of interest in the left and right image coordinate systems.

5. The method according to claim 1, wherein in said detecting step, a line of sight of the viewer is detected by detecting a rotation of the eyeball with respect to two axes of the eyeball.

6. The method according to claim 1, further comprising a step of initiating said detecting step.

7. The method according to claim 6, wherein said initiating step starts said detecting step on a manual input instruction by the user.

8. The method according to claim 6, wherein in said initiating step, timing at which said detecting step should be started is determined based on variations in the line of sight of the user.

9. The method according to claim 8, wherein in said initiating step, the timing at which said detecting step should be started is determined by detecting a state where the variations in the line of sight of the user are smaller than a predetermined threshold.

10. The method according to claim 8, wherein said initiating step comprises:

a second detecting step of detecting line-of-sight data of the user in a sequential order;

a step of storing in a predetermined memory, only the line-of-sight data having a smaller variation in the line of sight than a predetermined threshold; and a step of deciding timing to start said detecting step when the stored line-of-sight data reaches a predetermined sample number.

11. The method according to claim 10, wherein in said calculating step, an average value of the predetermined sample number of line-of-sight data is calculated in response to said timing deciding step; and three-dimensional coordinates of the point of interest are calculated based on the calculated average value of line-of-sight data.

12. The method according to claim 10, wherein said calculating step further comprises the steps of:

sequentially storing in a predetermined memory, line-of-sight data detected at the timing decided in said timing deciding step; and in a case where variations in a number of line-of-sight data are larger than a predetermined threshold value among a plurality of line-of-sight data stored in the predetermined memory, deleting said number of line-of-sight data except one data.

13. The method according to claim 1, wherein in said detecting step, a rotation amount of the eyeball in the vertical direction and a rotation amount of the eyeball in the horizontal direction are detected as a line of sight.

14. A storage medium storing a program implementing the identifying method according to claim 1.

15. An apparatus for identifying three-dimensional coordinates of points of interest on a plurality of images obtained from an object, comprising:
   stereo-image presenting means for presenting to a user a left image and a right image as a stereo image;
   detecting means for detecting left and right gazing points corresponding to left and right lines-of-sight on the left and right images presented by said stereo-image presenting means, of eyes of the user, respectively; and
   calculating means for calculating three-dimensional coordinates of a point of interest at which the user is gazing, based on the detected left and right gazing points and a convergence angle between the left and right lines-of-sight.

16. The apparatus according to claim 15, further comprising stereo cameras spaced from each other by a base length, for picking up the left and right images.

17. The apparatus according to claim 15, wherein said calculating means further comprises:
   means for obtaining two-dimensional coordinates of the point of interest in left and right image coordinate systems provided respectively for the left and right images, based on a distance L from an eyeball of the user to a display surface where the left and right are displayed, and the left and right lines-of-sight, and
   means for obtaining three-dimensional coordinates of the point of interest based on obtained coordinates positions of the point of interest in either one of the left and right image coordinate system, the base length of the user, and a difference of the coordinates positions of the point of interest in the left and right image coordinate systems.

18. The apparatus according to claim 15, wherein said detecting means comprises means for detecting a rotation of the eyeball with respect to two axes of the eyeball.

19. The apparatus according to claim 15, further comprising initiating means for starting said detecting means.

20. The apparatus according to claim 19, wherein said initiating means detects a manual input by the user to start said detecting means.

21. The apparatus according to claim 19, wherein said initiating means determines timing at which said detecting means should be started, based on variations in the line of sight of the user.

22. The apparatus according to claim 21, wherein said initiating means determines the timing at which said detecting means should be started by detecting a state where the variations in the line of sight of the user are smaller than a predetermined threshold.

23. The apparatus according to claim 21, wherein said initiating means comprises:
   means for detecting line-of-sight data of the user in a sequential order;
   means for storing in a predetermined memory, only the line-of-sight data having a smaller variation in the line of sight than a predetermined threshold; and
   means for deciding timing to start said detecting means when the stored line-of-sight data reaches a predetermined sample number.

24. The apparatus according to claim 23, wherein said calculating means comprises:
   means for calculating an average value of the predetermined sample number of line-of-sight data in response to said deciding means; and
   means for calculating three-dimensional coordinates of the point of interest based on,the calculated average value of line-of-sight data.

25. The apparatus according to claim 23, wherein said calculating means further comprises:
   a memory for sequentially storing line-of-sight data detected at a timing decided by said timing deciding means; and
   deleting means for, in a case where variations of a number of line-of-sight data are larger than a predetermined threshold value among a plurality of line-of-sight data stored in said memory, deleting said number of line-of-sight data except one data.

26. The apparatus according to claim 15, wherein said detecting means detects a rotation amount of the eyeball in the vertical direction and a rotation amount of the eyeball in the horizontal direction as a line of sight.

27. The apparatus according to claim 15, wherein said detecting means further comprises:
   irradiation means having a light source which irradiates an invisible ray for irradiating each eyeball;
   an optical system for focusing the invisible ray reflected by each eyeball;
   image pickup means for picking up an image formed by said optical system; and
   means for obtaining a center position of the pupil in the eye and a position of the light source in a virtual image formed by cornea reflection, based on the picked-up image of the eyeball, and obtaining a rotation angle of the eyeball based on a relative relation between the center position and the position of virtual image.

28. The apparatus according to claim 15, wherein said detecting means detects a state in which variations in the convergence angles of the eyeball of the user remain smaller than a predetermined threshold value for a predetermined period, determines a point of interest of the user during the predetermined period based on an arbitrary convergence angle value or a convergence angle average value, and selects said point of interest as a point for defining a shape of the object.

29. The apparatus according to claim 15, wherein said stereo-image presenting means comprises a head-mount display device which keeps a fixed relative positional relation between a user's head and a display surface.

30. The apparatus according to claim 15, wherein said stereo-image presenting means comprises:
   a stereo-image display fixed on a table; and
   means for correcting said stereo-image presenting means by detecting a relative positional deviation of the user's head with respect to the display.

31. A three-dimensional shape information input method of inputting three-dimensional coordinates of points of interest on a plurality of images obtained from an object as three-dimensional shape information, comprising the steps of:
   presenting to a user a first image and a second image as a stereo image;
   detecting at a predetermined timing, left and right lines of sight of the user;
   calculating three-dimensional coordinates of a point of interest at which the viewer is gazing, based on the left and right line-of-sight data detected in said detecting step; and repeating said detecting step and calculating step with respect to other points of interest, and inputting a group of three-dimensional coordinates of points of interest obtained respectively, in a memory as three-dimensional shape information of the object.

32. A storage medium storing a program implementing the inputting method according to claim 31.

33. A three-dimensional shape information input apparatus for inputting three-dimensional coordinates of points of interest on a plurality of images obtained from an object as three-dimensional shape information, comprising:

presenting means for presenting to a user a first image and a second image as a stereo image;

detecting means for detecting at a predetermined timing, left and right lines of sight of the user;

calculating means for calculating three-dimensional coordinates of a point of interest at which the user is gazing, based on the left and right line-of-sight data detected by said detecting means; and input means for inputting a group of three-dimensional coordinates of points of interest, obtained by said detecting means and said calculating means with respect to a number of points of interest, in a memory as three-dimensional shape information of the object.

34. A three-dimensional line-of-sight indicating method of inputting user's indication based on points of interest viewed by a user on a left image and a right image obtained from an object, comprising the steps of:

presenting to the user the left and right images as a stereo image;

detecting left and right gazing points corresponding to left and right lines-of-sight on the left and right images, of eyes of the user, respectively;

calculating three-dimensional coordinates of a point of interest at which the user is gazing, based on the detected left and right gazing points and a convergence angle between the left and right line-of-sight; and outputting the calculated three-dimensional coordinates of the point of interest as user's indication data.

35. A storage medium storing a program implementing the line-of-sight indicating method according to claim 34.

36. A three-dimensional line-of-sight indicating apparatus for inputting user's indication based on points of interest viewed by a user on a left image and a right image obtained from an object, comprising:

presenting means for presenting to the user the left and right images as a stereo image;

detecting means for detecting left and right gazing points corresponding to left and right lines-of-sight of eyes of the user;

calculating means for calculating three-dimensional coordinates of a point of interest at which the user is gazing, based on the detected left and right gazing points and a convergence angle data between the left and right line-of-sight; and outputting means for outputting the calculated three-dimensional coordinates of the points of interest as user's indication data.

* * * * *

UNITED STATES PATENT AND TRADEMARK OFFICE
CERTIFICATE OF CORRECTION

PATENT NO. : 6,611,283 B1
DATED : August 26, 2003
INVENTOR(S) : Tomoyuki Isonuma It is certified that error appears in the above-identified patent and that said Letters Patent is hereby corrected as shown below:

Column 11,
Line 51, Equation (1), "$\alpha_R = \arcsin(d_{xR} \times C_{1R}) - C_{2R}$" should read -- $\alpha_R = \arcsin(d_{xR} \times C_{1R}) - C_{2R}$ --
Line 58, Equation (2), "$\beta_R = \arcsin(d_{yR} \times C_{3R}) - C_{4R}$" should read -- $\beta_R = \arcsin(d_{yR} \times C_{3R}) - C_{4R}$ --

Column 15,
Line 6, Equation (7), "$X_c = X_{Lxt}$" should read -- $X_c = X_L \times t$ --
Line 8, Equation (8), "$Y_c = Y_{Lxt}$" should read -- $Y_c = Y_L \times t$ --
Line 10, Equation (9), "$Z_c = Lxt$" should read -- $Z_c = L \times t$ --

Column 16,
Line 63, "$\Delta 1$" should read -- $\Delta \ell$ --

Column 17,
Line 1, Equation (10), "$\Delta 1 =$" should read -- $\Delta \ell =$ --
Line 6, "$\Delta 1$" should read -- $\Delta \ell$ --
Line 7, "$\Delta 1$" should read -- $\Delta \ell$ --

Column 20,
Line 27, "of the viewer" should read -- of the user --

Signed and Sealed this

Ninth Day of March, 2004

JON W. DUDAS
*Acting Director of the United States Patent and Trademark Office*